United States Patent
Leppanen et al.

(10) Patent No.: US 9,185,521 B2
(45) Date of Patent: Nov. 10, 2015

(54) METHOD AND APPARATUS FOR PROVIDING A COLLABORATIVE REPLY OVER AN AD-HOC MESH NETWORK

(71) Applicant: NOKIA CORPORATION, Espoo (FI)

(72) Inventors: Kari Leppanen, Helsinki (FI); Mika Kasslin, Espoo (FI); Mikko Tirronen, Helsinki (FI); Markku T. Turunen, Helsinki (FI); Sami Virtanen, Espoo (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 14/453,308

(22) Filed: Aug. 6, 2014

(65) Prior Publication Data

US 2014/0349684 A1    Nov. 27, 2014

Related U.S. Application Data

(63) Continuation of application No. 13/487,529, filed on Jun. 4, 2012, now abandoned, which is a continuation of application No. 12/475,351, filed on May 29, 2009, now Pat. No. 8,194,541.

(51) Int. Cl.
*H04W 4/02* (2009.01)
*H04W 40/24* (2009.01)
*H04W 8/00* (2009.01)
*H04W 84/18* (2009.01)

(52) U.S. Cl.
CPC .............. *H04W 4/02* (2013.01); *H04W 40/246* (2013.01); *H04W 8/005* (2013.01); *H04W 84/18* (2013.01)

(58) Field of Classification Search
CPC ..................................................... H04W 84/18
See application file for complete search history.

(56) References Cited

U.S. PATENT DOCUMENTS

| | | | |
|---|---|---|---|
| 5,898,679 A | 4/1999 | Brederveld et al. | |
| 6,134,587 A | 10/2000 | Okanoue | |
| 6,175,571 B1 | 1/2001 | Haddock et al. | |
| 7,181,170 B2 | 2/2007 | Love et al. | |
| 7,184,421 B1 | 2/2007 | Liu et al. | |
| 7,307,978 B2 * | 12/2007 | Carlson | 370/349 |
| 7,525,933 B1 | 4/2009 | Hall | |
| 7,573,888 B2 | 8/2009 | Previdi et al. | |
| 7,685,134 B2 | 3/2010 | Myka et al. | |
| 8,194,541 B2 | 6/2012 | Leppanen et al. | |
| 2002/0030699 A1 | 3/2002 | Van Ee | |
| 2002/0163912 A1 | 11/2002 | Carlson | |
| 2003/0018744 A1 * | 1/2003 | Johanson et al. | 709/217 |
| 2003/0202498 A1 | 10/2003 | De Heer et al. | |
| 2004/0162027 A1 | 8/2004 | Chang | |

(Continued)

OTHER PUBLICATIONS

Office Action for corresponding Korean Application No. 10-2011-7031598, mailed Jul. 11, 2013, 4 pages (Concise Explanation of Relevancy Included).

(Continued)

*Primary Examiner* — Hassan Kizou
*Assistant Examiner* — Ashil Farahmand
(74) *Attorney, Agent, or Firm* — Ditthavong & Steiner, P.C.

(57) ABSTRACT

An approach is provided for providing a collaborative reply to a flooding message over an ad-hoc mesh network. A reply message to a flooding message is received by a wireless node within the ad-hoc network. The wireless node monitors for an acknowledgement of receipt of the reply message according to a routing table and initiates a scheduled transmission of the reply message based on the monitoring.

20 Claims, 21 Drawing Sheets

(56) References Cited

U.S. PATENT DOCUMENTS

| | | | |
|---|---|---|---|
| 2004/0218557 A1 | 11/2004 | Kim et al. | |
| 2005/0030921 A1 | 2/2005 | Yau | |
| 2005/0038876 A1* | 2/2005 | Chaudhuri | 709/219 |
| 2005/0138671 A1 | 6/2005 | Love et al. | |
| 2005/0185632 A1 | 8/2005 | Draves, Jr. et al. | |
| 2005/0207376 A1 | 9/2005 | Ashwood-Smith et al. | |
| 2005/0278758 A1 | 12/2005 | Bodlaender | |
| 2006/0045066 A1 | 3/2006 | Choi et al. | |
| 2006/0245360 A1 | 11/2006 | Ensor et al. | |
| 2007/0036096 A1 | 2/2007 | Sinivaara | |
| 2007/0076672 A1 | 4/2007 | Gautier et al. | |
| 2007/0121521 A1 | 5/2007 | D'Amico et al. | |
| 2007/0271234 A1 | 11/2007 | Ravikiran | |
| 2007/0273583 A1 | 11/2007 | Rosenberg | |
| 2008/0002640 A1 | 1/2008 | Westphal | |
| 2008/0056149 A1 | 3/2008 | Madhavan et al. | |
| 2008/0082557 A1* | 4/2008 | Ohara et al. | 707/100 |
| 2008/0170518 A1 | 7/2008 | Duggi et al. | |
| 2010/0020773 A1 | 1/2010 | Jechoux | |

OTHER PUBLICATIONS

Clausen et al., Optimized Link State Routing Protocol (OLSR), Request for Comments: 3626, Network Working Group, Oct. 2003, pp. 1-73.
Denysyuk: Group Communication in Mobile Ad hoc Networks. pp. 1-21, http://www.gsd.inesc-id.pt/~ler/reports/oksanadenysyuk-midterm.pdf, Jan. 2009.
Final Rejection for related U.S. Appl. No. 12/475,359, dated Oct. 27, 2011, pp. 1-20.
International Search Report and Written Opinion for corresponding International Application No. PCT/IB2010/052404, dated Sep. 24, 2010, pp. 1-15.
International Search Report and Written Opinion for corresponding International Application No. PCT/IB2010/052405, dated Sep. 17, 2010, pp. 1-15.
International Search Report and Written Opinion for corresponding International Application No. PCT/IB2010/052406, dated Sep. 14, 2010, pp. 1-15.
Mani et al., "What's up: P2P spontaneous social networking", 2009 IEEE International conference on Pervasive Computing and Communications, Mar. 9-13, 2009, pp. 1-2.
Ni et al., The Broadcast Storm Problem in a Mobile Ad Hoc Network, in Proceedings of the 5th Annual ACM/IEEE International Conference on Mobile Computing and Networking, Mobicom '99 Seattle Washington USA, pp. 151-162.
Nourazar et al., DAPF: An Efficient Flooding Algorithm for Mobile Ad-hoc Networks, 2009 International Conference on Signal Processing Systems, IEEE Computing Society, pp. 594-598.
Office Action for related U.S. Appl. No. 12/475,359, dated Apr. 6, 2011, pp. 1-11.
Office Action for related U.S. Appl. No. 12/475,356, dated Nov. 15, 2011, pp. 1-20.
Perkins et al., Ad-hoc On-Demand Distance Vector (AODV) Routing, Jul. 2003, pp. 1-38.
Philip, Routing and Location Management in Mobile Ad-hoc Networks, Published: Sep. 20, 2001, pp. 1-51, www.cse.buffalo.edu/~qiao/cse620/adhoc_loc.ppt.
Pietilainen et al., Social Pocket Switched Networks, IEEE INFOCOM 2009—IEEE Conference on Computer Communications Workshops, Apr. 19-25, 2009, pp. 1-2.
Tseng et al., Adaptive Approaches to Relieving Broadcast Storms in a Wireless Mulithop Mobile Ad-hoc Network, IEEE Transactions on Computer, vol. 52, No. 5, May 2003, pp. 545-557.
Office Action for corresponding Vietnamese Application No. 1-2011-03584, dated Nov. 27, 2014, 1 page.

\* cited by examiner

FIG. 2F

| NETWORK LAYER MESSAGE HEADER 281 | | | | | | | |
|---|---|---|---|---|---|---|---|
| TX 282 (TRANSMITTER NID) | SRC 283 (SOURCE NID) | DST 284 (DESTINATION NID) | MSN 285 (MESSAGE SEQUENCE NUMBER) | HOP COUNT 286 | GEOGRAPHICAL LIMIT 287 | TEMPORAL LIMIT 288 | CONTEXT LIMIT 289 |

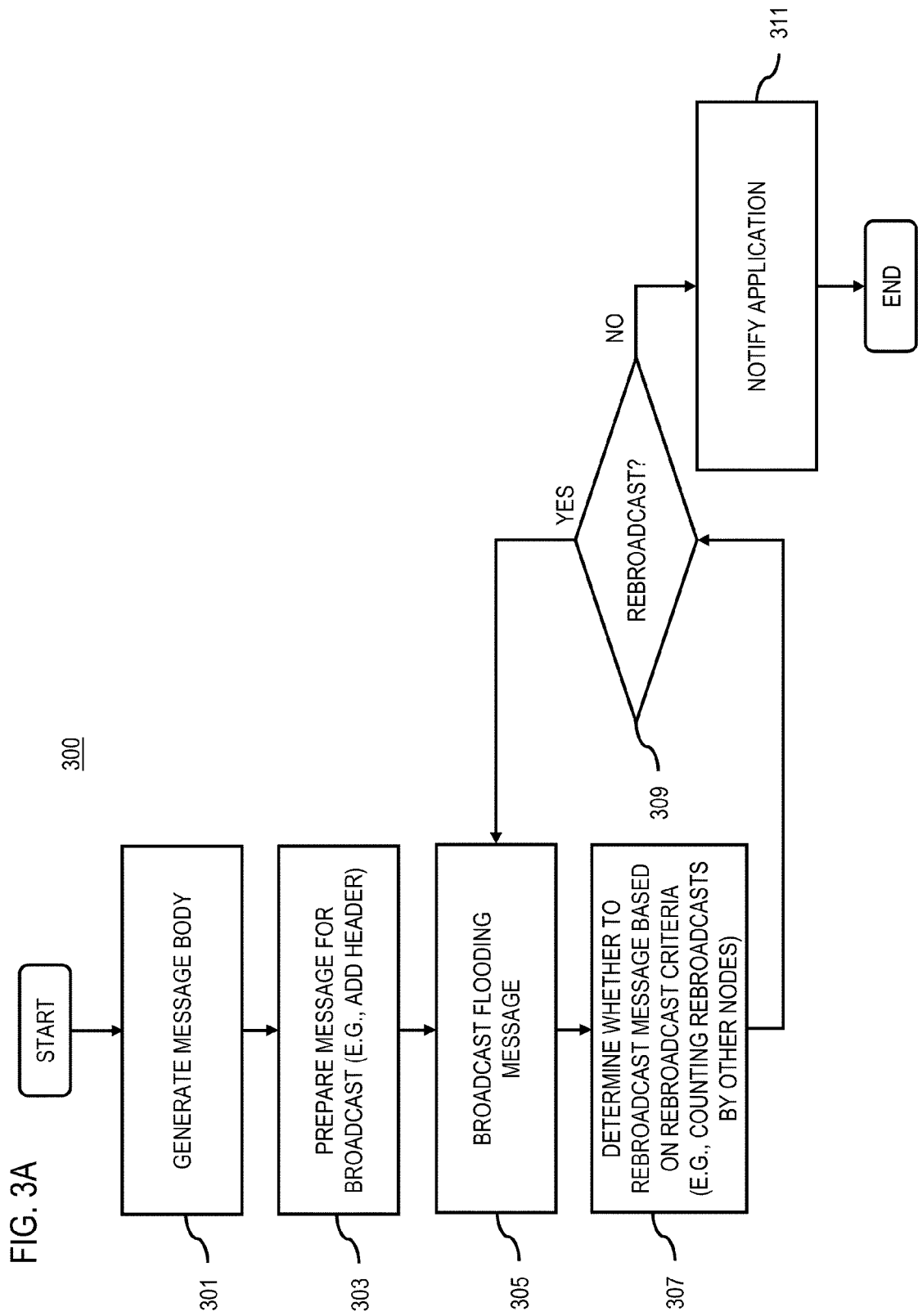

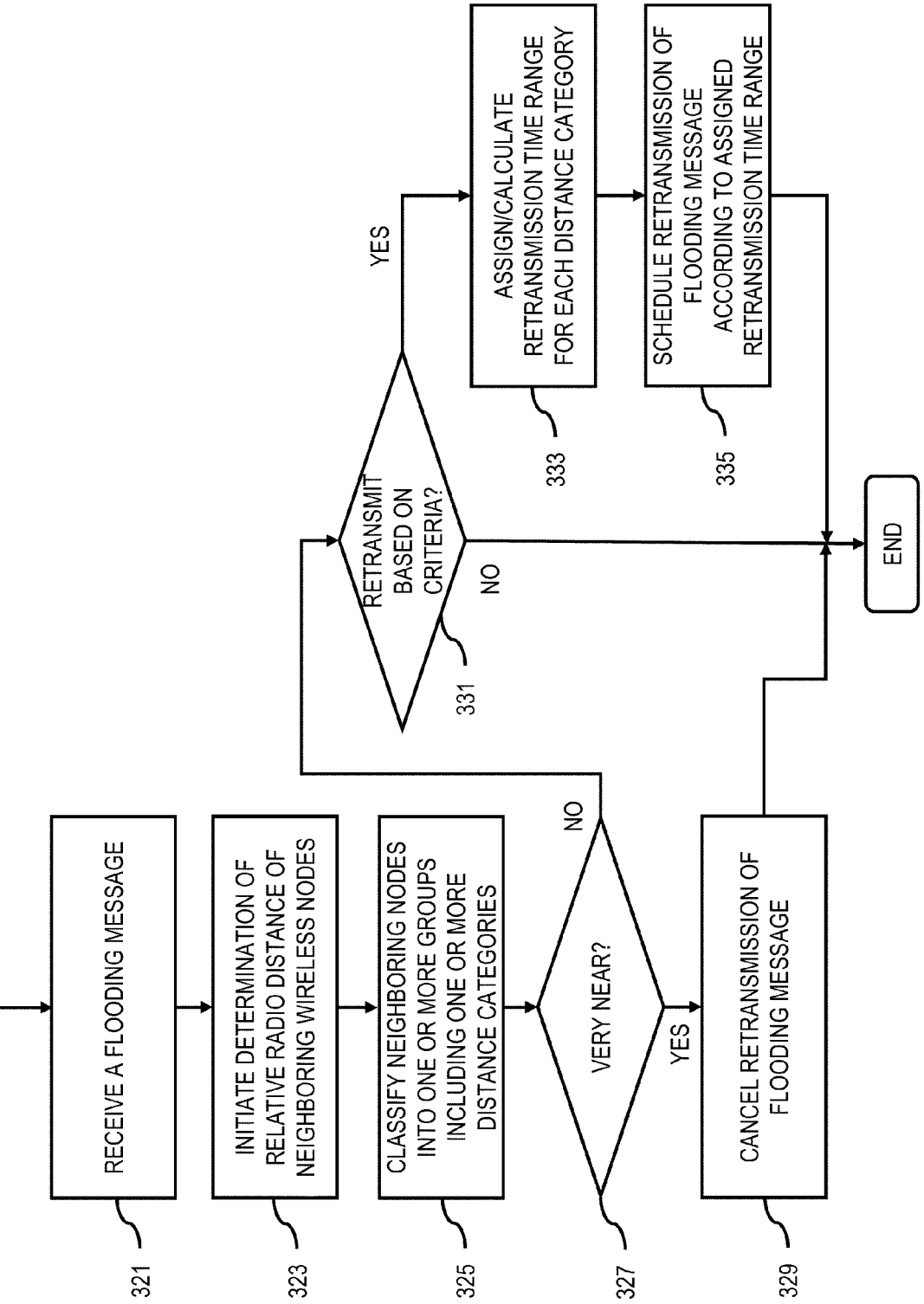

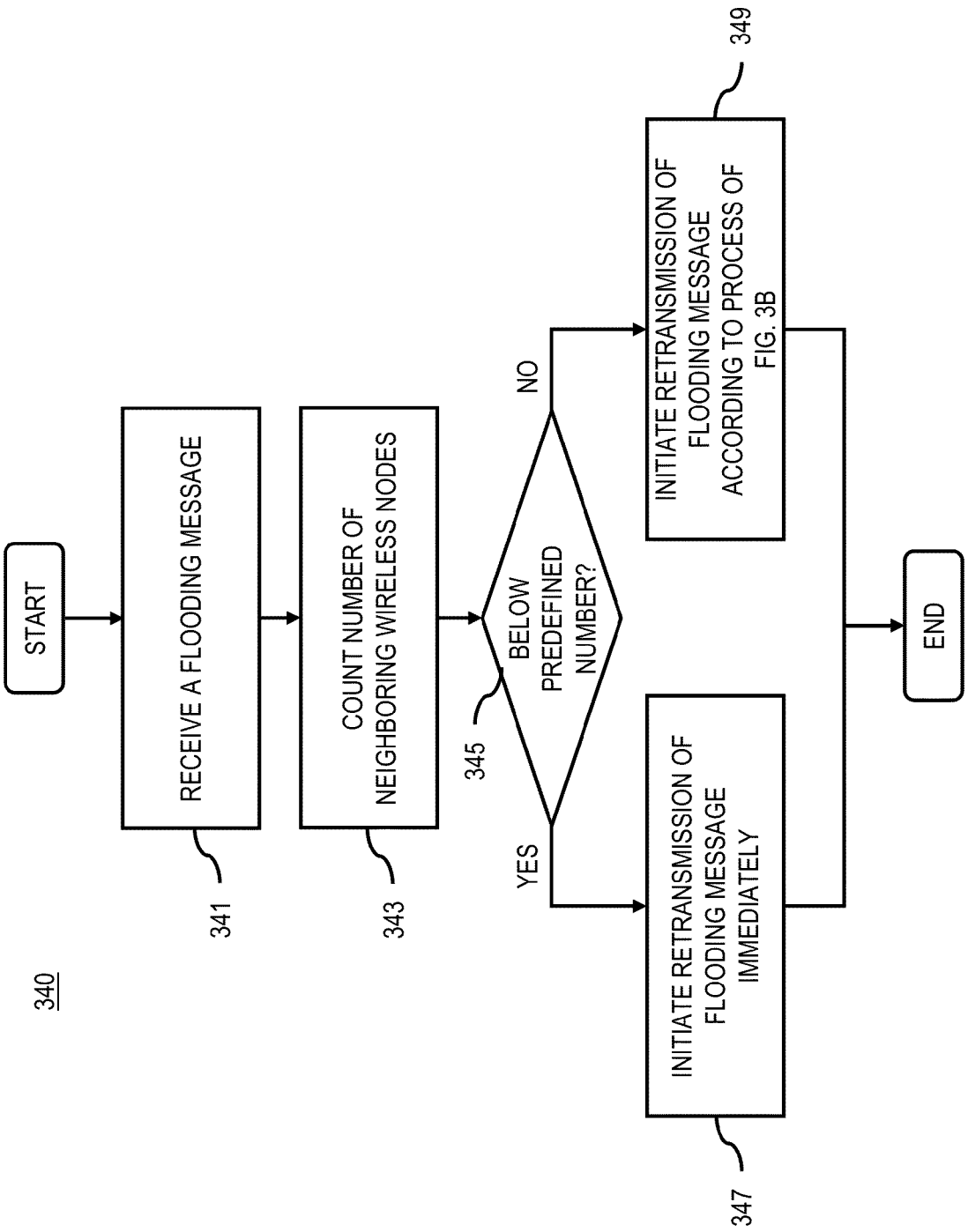

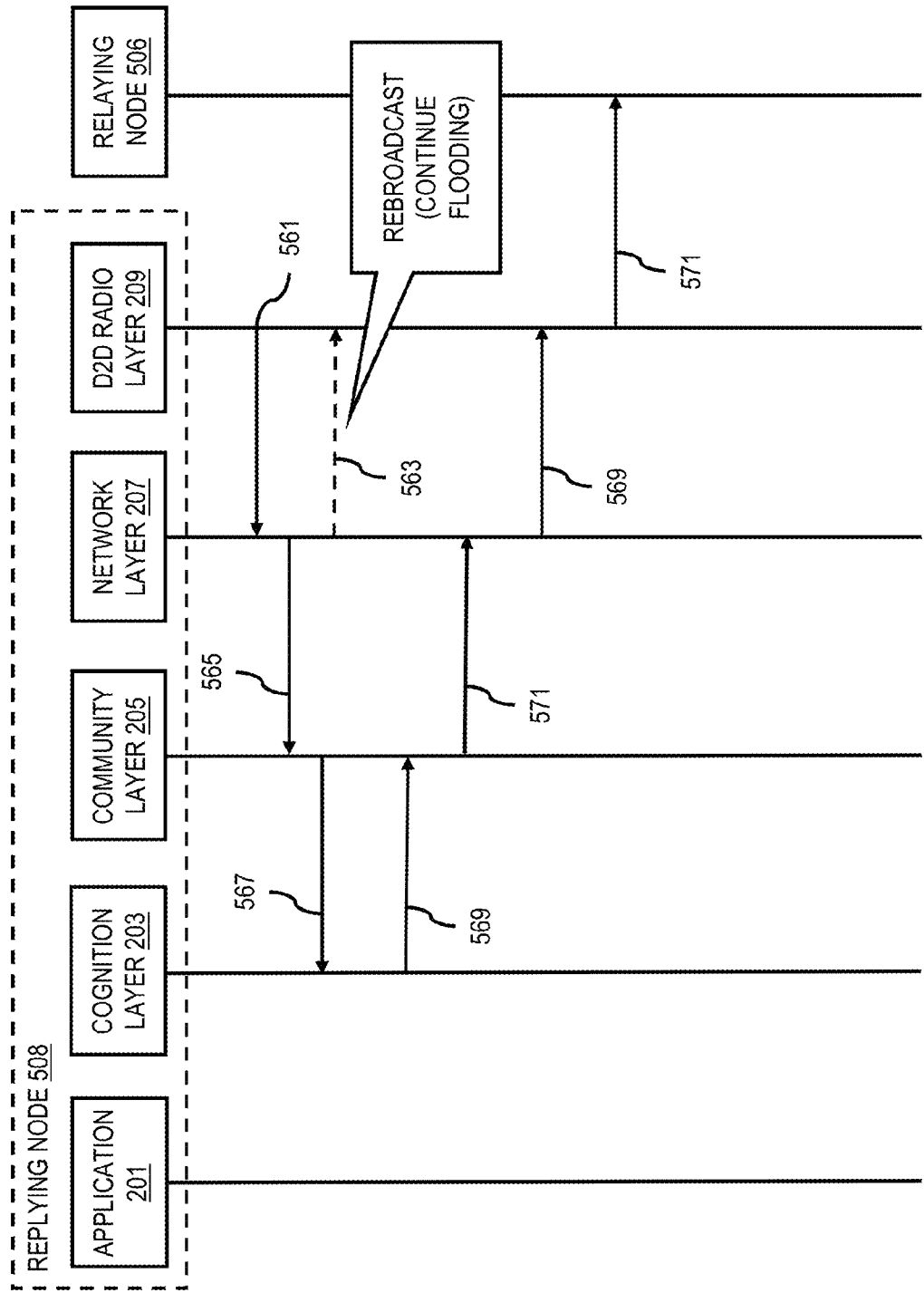

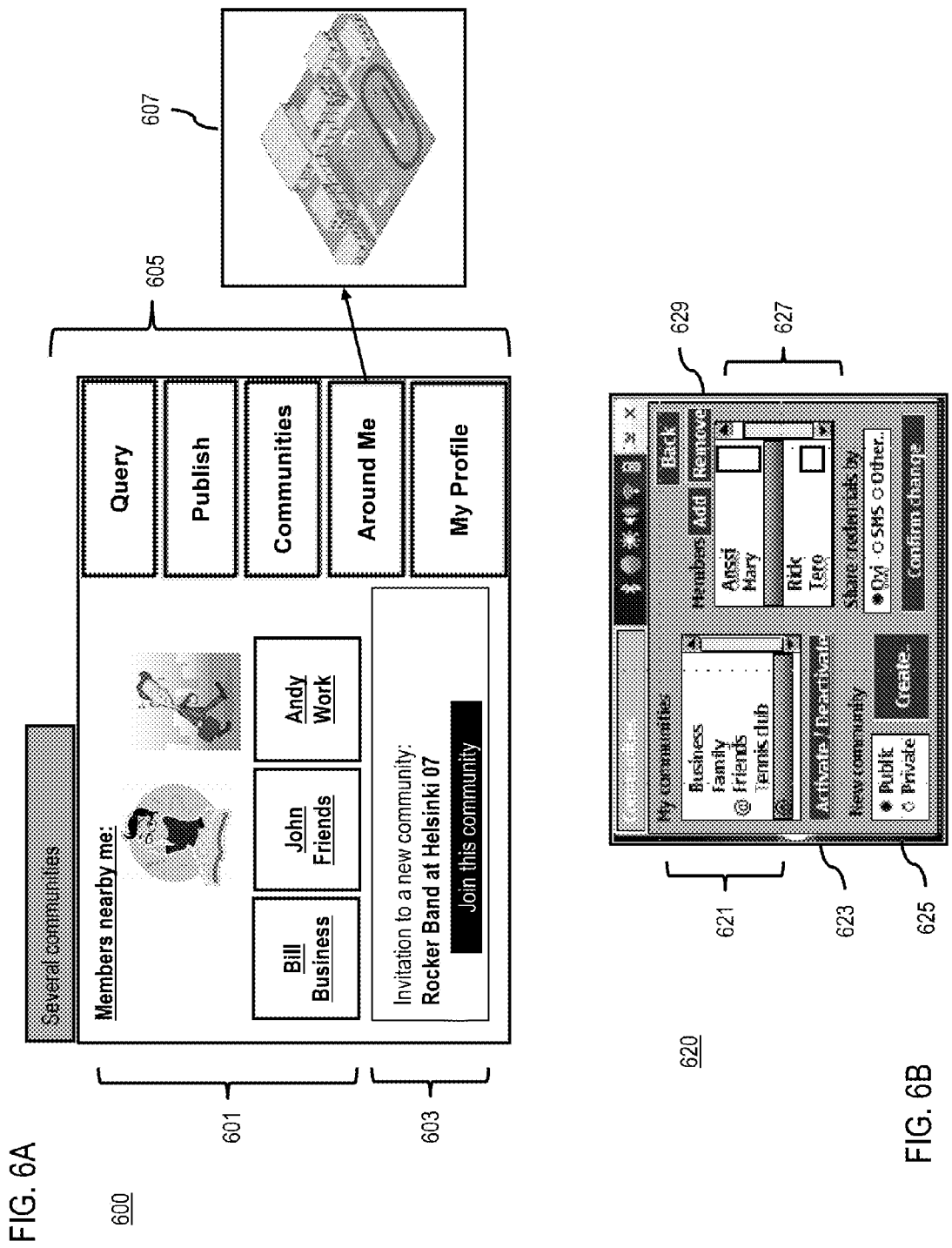

METHOD AND APPARATUS FOR PROVIDING A COLLABORATIVE REPLY OVER AN AD-HOC MESH NETWORK

CROSS-REFERENCE TO RELATED APPLICATIONS

The present application is a continuation application of U.S. patent application Ser. No. 13/487,529, filed Jun. 4, 2012, which is a continuation application of U.S. patent application Ser. No. 12/475,351, filed May 29, 2009; now U.S. Pat. No. 8,194,541, issued on Jun. 5, 2012, the entirety of both of which are incorporated herein by reference.

BACKGROUND

Wireless (e.g., cellular) service providers and device manufacturers are continually challenged to deliver value and convenience to consumers by, for example, providing compelling network services, applications, and content. One area of development is the use of device-to-device communication networks and devices to automatically determine information and context about the local environment. However, technical challenges relating to power consumption, signaling overhead, security, and privacy have hindered such development.

SOME EXEMPLARY EMBODIMENTS

Therefore, there is a need for an approach for efficiently locating and organizing information and associated context in a local environment.

According to one embodiment, a method comprises receiving a reply message to a flooding message from a neighboring wireless node. The method also comprises determining whether a receiving wireless node is specified in a routing table associated with the reply message. The method further comprises initiating transmission of the reply message to a next recipient wireless node in the routing table if the receiving wireless node is specified in the routing table. The method further comprises initiating a collaborative reply process if the receiving wireless node is not specified in the routing table.

According to another embodiment, an apparatus comprising at least one processor, and at least one memory including computer program code, the at least one memory and the computer program code configured to, with the at least one processor, cause the apparatus to receive a reply message to a flooding message from a neighboring wireless node. The apparatus is also caused to determine whether a receiving wireless node is specified in a routing table associated with the reply message. The apparatus is further caused to initiate transmission of the reply message to a next recipient wireless node in the routing table if the receiving wireless node is specified in the routing table. The apparatus is further caused to initiate a collaborative reply process if the receiving wireless node is not specified in the routing table.

According to another embodiment, a computer readable storage medium carrying one or more sequences of one or more instructions which, when executed by one or more processors, cause an apparatus to receive a reply message to a flooding message from a neighboring wireless node. The apparatus is also caused to determine whether a receiving wireless node is specified in a routing table associated with the reply message. The apparatus is further caused to initiate transmission of the reply message to a next recipient wireless node in the routing table if the receiving wireless node is specified in the routing table. The apparatus is further caused to initiate a collaborative reply process if the receiving wireless node is not specified in the routing table.

According to one embodiment, an apparatus comprises means for receiving a reply message to a flooding message from a neighboring wireless node. The apparatus also comprises means for determining whether a receiving wireless node is specified in a routing table associated with the reply message. The apparatus further comprises means for initiating transmission of the reply message to a next recipient wireless node in the routing table if the receiving wireless node is specified in the routing table. The apparatus further comprises means for initiating a collaborative reply process if the receiving wireless node is not specified in the routing table.

According to another embodiment, a method comprises providing access for receiving a reply message to a flooding message from a neighboring wireless node, for monitoring for acknowledgement of receipt of the reply message by a wireless node specified in a routing table corresponding to the flooding message, and for initiating transmission of the reply message to a next recipient wireless node as specified in the routing table, and for sharing information anonymously among neighboring wireless nodes.

According to yet another embodiment, an apparatus comprises means for providing access for receiving a reply message to a flooding message from a neighboring wireless node, for monitoring for acknowledgement of receipt of the reply message by a wireless node specified in a routing table corresponding to the flooding message, and for initiating transmission of the reply message to a next recipient wireless node as specified in the routing table, and for sharing information anonymously among neighboring wireless nodes.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2F is a diagram of the data structure of a network layer message header, according to an exemplary embodiment;

FIGS. 3A and 3B are flowcharts of processes for generating a flooding message and receiving a flooding message over an ad-hoc mesh network, respectively, according to various exemplary embodiments;

FIG. 3C is a flowchart of a process for retransmitting a flooding message based on the density of neighboring wireless nodes, according to an exemplary embodiment;

FIG. 5C is a ladder diagram that illustrates a sequence of messages and processes used in a replying node, according to an exemplary embodiment;

FIGS. 6A-6B are diagrams of a user interface utilized in the process of providing awareness information over an ad-hoc mesh network, according to various exemplary embodiments;

DESCRIPTION OF PREFERRED EMBODIMENT

A method and apparatus for providing awareness information are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

As used herein, the term "awareness information" refers to any information and/or context about a local environment as well as the users and communication devices within the local environment. By way of example, awareness information can be used to support applications for creating social networks, determining presence, determining contexts associated with a device, advertising, searching for information, etc. Although various exemplary embodiments are described with respect to providing awareness information over an ad-hoc mesh network, it is contemplated that the approach described herein may be used within any type of communication system or network.

Figure 1:
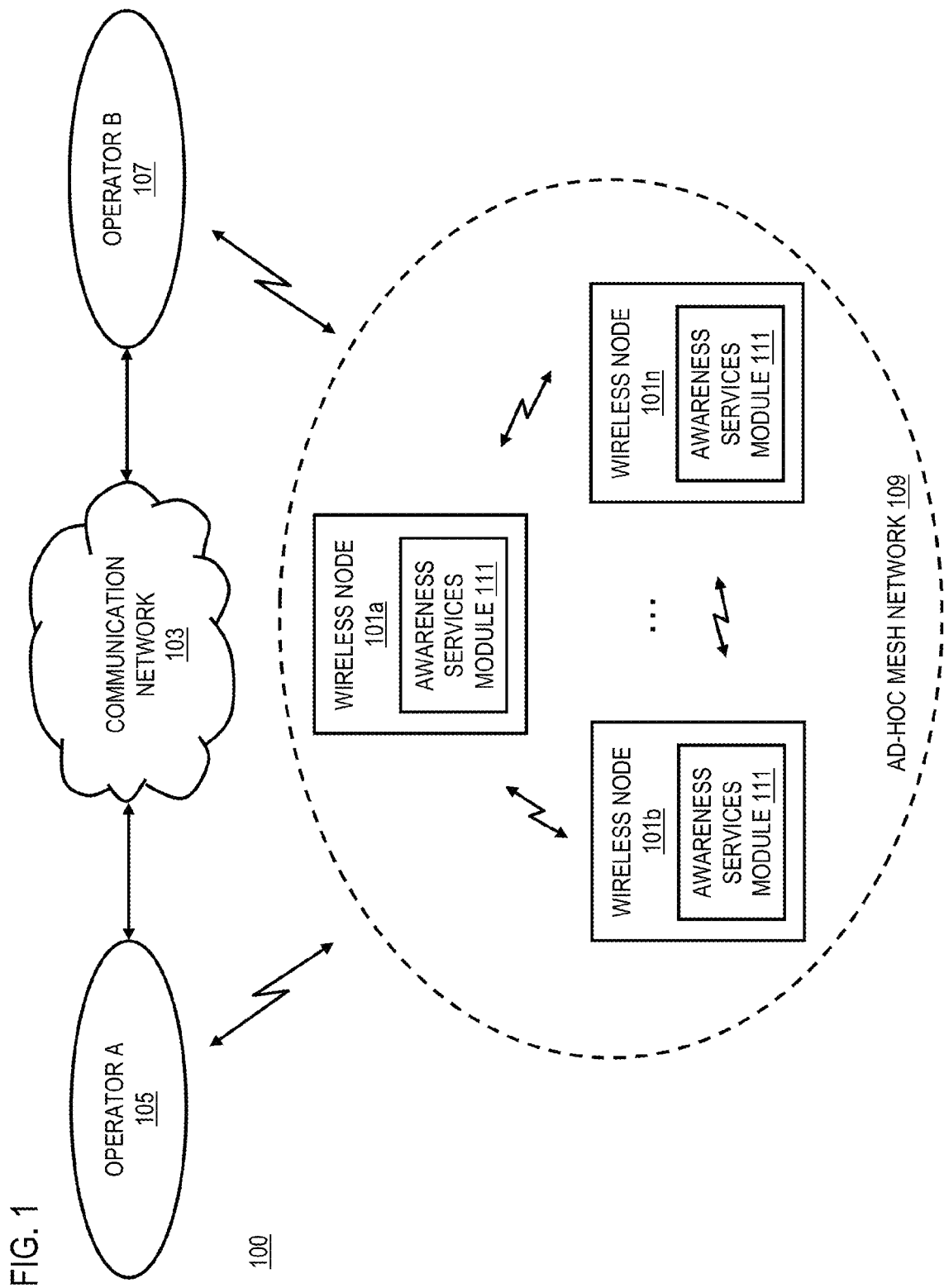
FIG. 1 is a diagram of a communication system capable of providing awareness information over an ad-hoc mesh network, according to an exemplary embodiment.

FIG. 1 is a diagram of a communication system capable of providing awareness information over an ad-hoc mesh network, according to an exemplary embodiment. Information and context comprise "awareness information" that metaphorically equip a communication device with "radio eyes and ears" to continuously collect and exchange information with other devices in a local environment. However, development of a system for providing awareness information poses significant technical challenges, particularly in the areas of creating a network for sharing awareness information, locating and organizing awareness information, forming communities for sharing awareness information, managing power consumption for devices constantly engaged in sharing awareness information, developing applications to take advantage of the awareness information, maintaining the privacy and anonymity of users sharing awareness information, and preventing the proliferation of undesired messages (e.g., spam) over the network.

As shown in FIG. 1, a system 100 comprises one or more wireless nodes 101a-101n optionally having connectivity to a communication network 103 through either operator A 105 or operator B 107. The wireless nodes 101a-101n are any type of mobile terminal, portable terminal, or fixed terminal including mobile handsets, personal computers, stations, units, devices, multimedia tablets, Internet nodes, communicators, Personal Digital Assistants (PDAs), radio readable tags (e.g., near field communication (NFC) tags, radio frequency identification (RFID) tags), or any combination thereof. It is also contemplated that the wireless nodes 101a-101n can support any type of interface to the user (such as "wearable" circuitry, etc.).

In exemplary embodiments, the wireless nodes 101a-101n form an ad-hoc mesh network 109 for sharing awareness information. The ad-hoc mesh network 109 is, for instance, a connectionless and serverless device-to-device network (e.g., a mobile ad-hoc network (MANET)) created using short-range radio technology (e.g., wireless local area network (WLAN) or Bluetooth®). Within the ad-hoc mesh network 109, each wireless node 101 may be mobile and is within communication range of any number of other wireless nodes 101. Accordingly, the set of wireless nodes 101a-101n that is within communication range of any a particular wireless node 101 is transient and can change as the wireless nodes 101a-101n move from location to location.

As discussed previously, service providers and device manufacturers that are developing communication systems and networks for providing awareness information face many technical challenges. For example, current ad-hoc radios (e.g., WLAN and Bluetooth®) are designed for connectivity (e.g., connectivity via Internet protocol (IP)). However, in an "always on" environment such as the ad-hoc mesh network 109, it is not practical to have a large number of wireless nodes 101a-101n (e.g., mobile handset devices) "connected" by, for instance, IP to each other for extended periods of time because of power usage and scalability problems. Specifically, a multi-hop connection in a large ad-hoc network typically requires a significant amount of control signaling and power and can quickly deplete a mobile device's battery. Moreover, scalability can be a problem because current ad-hoc radios are typically limited in the number of connections and the related signaling that they can support at any given time. Another shortcoming of current ad-hoc radios is that they do not adequately protect a user's privacy because they expose the user's identity through a fixed network address (e.g., a media access control (MAC) address) associated with the user's device.

To address these problems, the system 100 creates the ad-hoc mesh network 109 for sharing awareness information in a connectionless fashion. As used herein, the term "connectionless" refers to the ability of a node (e.g. wireless node 101a) to send and of all surrounding nodes 101a-101n to receive awareness information without the need to send any prior control signaling. For example, sending awareness information using the transmission control protocol/IP (TCP/IP) over a WLAN ad-hoc is not connectionless because of the two-way TCP control signaling between the sending and receiving nodes used to establish the TCP connection. The awareness information is provided, for instance, in small anonymous messages that are exchanged by the wireless nodes 101a-101n automatically without user intervention. As used herein, the term "anonymous" means that it is not possible to infer the true identity of the sender from the message, unless the true identity is intentionally included in the message (e.g., by the user or another entity authorized by the user). The exchange of awareness information occurs as a broadcast message (i.e., a flooding message) from a wireless node 101 to neighboring wireless nodes 101 that are within range of the radio of the broadcasting wireless node 101. As neighboring wireless nodes 101 receive the broadcasted message, each receiving wireless node 101 may in turn rebroadcast the message to other neighboring wireless nodes 101. In this way, the originally broadcasted message propagates throughout the ad-hoc mesh network 109. In exemplary embodiments, the extent of the propagation may be limited by criteria such as distance, location, time, etc.

Unlike traditional systems, such messages are only for carrying awareness information and are not for transporting content (e.g., files or media containing voice, video, etc) between two wireless nodes (e.g., wireless nodes 101a and 101b). Instead, the messages contain only pointers to the content or a small amount of data (e.g. presence or context information) to minimize the data traffic transported over the ad-hoc mesh network 109. The wireless nodes 101a-101n may then access the content using other communication channels (e.g., via IP through the communication network 103). In addition, the system 100 eliminates the problems associated with traditional methods for route establishment and maintenance (e.g., connection based communication protocols), such as maintaining and handing off connections as mobile devices move, and requiring high levels of network resources for maintaining connections in an environment with a high number or density of mobile devices. For example, the event of a wireless node 101 appearing/disappearing to/from the network does not generate any control signaling in the ad-hoc mesh network 109. Similarly, the system 100 creates routing information only when needed to route replies to queries back to the querying node. The routing information is generated by using the query messages alone (i.e. no control signaling is used for creating routing information). After the query and subsequent reply process is completed, the routes are forgotten. In other words, the query/reply process of system 100 provisions routes for a reply to provide awareness information on demand rather than pushing awareness information from one node 101 to another. In exemplary embodiments, both push (e.g., information is published over the ad-hoc mesh network 109) and pull (e.g., information is queried from other nodes 101a-101n of the ad-hoc mesh network 109) modes of disseminating awareness information are possible. In certain embodiments, it is contemplated that the pull mode of operation can be used instead of the push mode to help suppress potential spam messages.

Moreover, the system 100 optimizes the power consumption of wireless nodes 101 communicating over the ad-hoc mesh network 109 to enable always-on operation without seriously affecting the battery life of the wireless nodes 101. For instance, by utilizing only short awareness messages, by eliminating the need for any route maintenance signaling, by employing procedures to minimize transmission and reception of duplicative messages and by enabling an efficient sleep scheme for the short-range device-to-device radio used within each wireless node 101 (allowed by the low latency requirements typical of an awareness information network), the system 100 can potentially provide hundreds of hours (e.g., over 400 hours) of continuous operation of each wireless node 101 between battery charges in a mobile device. The system 100 could be seen as a "nervous system" between the mobile devices, where small messages ("nerve impulses") are continuously exchanged by the mobile devices ("neurons") in order to bring awareness to the user of a mobile device about the user's surroundings.

The system 100 also enables the development of new services and applications based on awareness information (e.g., social networking applications, location-based applications, application for determining presence, applications for determining context, advertising applications). In particular, the continuous and immediate nature of the awareness information with respect to local environment enables compelling new services. For instance, awareness information may be combined with the increasingly available storage and computing power in mobile devices (e.g., wireless nodes 101a-101n) to create a local semantic web, whereby local awareness information is created and searched for automatically by wireless nodes 101 within the ad-hoc mesh network 109. As used herein, the term "semantic web" refers to a system in which the information and messages shared with the system is understandable by the nodes 101 within the system. It is noted that establishing such a local semantic web using the system 100 overcomes two major problems blocking the development of a global semantic web: (1) lack of mechanism for providing semantic content on a large scale, and (2) lack of semantically aware search engines to help users find information in a semantic web. The system 100 can also be used for collaborative context calculation, publishing pointers to information or content, search for friends within a defined community, finding out what is going on and what kind of people are around a user, making the environment aware of the user, and other like applications.

The following are exemplary use-case scenarios for applications based on awareness information.

In a first use-case, the awareness information alerts a user to nearby people or places. For example, a user is visiting a new town when the wireless node 101a alerts the user that "Salvatore, a friend of your friend David is nearby." The user may then arrange to meet Salvatore to get a recommendation for sites to visit in the new town. In another example, a user is looking for a good restaurant in an unfamiliar neighborhood. An application based on awareness information may present a list of local restaurants ranked by the number of people currently eating in the restaurant that have the same food preferences as the user. Such a list can be collected based on queries and replies that contain anonymous information of people's food preferences.

In a second use-case, an application uses the awareness information to discover events near the user. For example, as a user passes a park, the wireless node 101a informs the user, based on messages exchanged between nearby devices, that "There is a Japanese culture festival in the Tea Garden Park; five members of your Kabuki community are there: Zen, Mi, Xia, Talo, and Chris." The user may then decide to attend the festival.

In a third use-case, an application provides location-based or context-based services using awareness information. For example, a wireless node 101a does not have positioning capabilities but nonetheless knows that it is in a grocery store based on anonymous awareness information from other nearby wireless nodes 101. It is contemplated that the grocery store may also place a node 101 in the store to provide such context information, possibly combined with other store specific information such as the address of the store's web page. The wireless node 101a then reminds the user to "Remember to buy dishwasher detergent" based on the user's location in a grocery store. The awareness information can also be the physical position information from a neighboring wireless node 101 that has the positioning capability. Sharing of positioning information with a neighboring node with such a capability can enable nodes 101 without such capability to offer navigational services.

In another example, a group of people are attending a meeting. The meeting invitation includes an identification code for that particular meeting that is stored in the mobile nodes 101 of the meeting attendees (e.g., the identification code may be stored in the calendar data). Using the principles set forth in this invention, the nodes 101 can exchange the meeting identification code over the ad-hoc mesh network 109 while attending the meeting. Comparing the exchanged identification code in a user's wireless device 101 can, for instance, establish whether the users was indeed at the meeting corresponding to the identification code. Such accurate social context knowledge can be used, for instance, to adapt the service or application behavior towards the user.

In a fourth use-case, an application provides for search of local information that changes rapidly and very specific to a local environment. The local information often does not reach traditional Internet search engines. For example, a user bought tickets to a concert, but discovers at the last minute that the user cannot attend. The user stores a string "Ticket to concert X at venue Y is available" into the awareness services module 111 of the user's wireless node 101. As a result, a nearby wireless node 101a, within a few street blocks away, that searches for tickets by sending query messages with a string "Ticket concert X" over the multi-hop ad-hoc mesh network 109, will receive the user's ticket availability message as an automatic reply.

In a fifth use-case, an application enables locally targeted advertising. For example, it is almost closing time for a local fresh fruit market. The merchants decide to publish an advertisement over the ad-hoc mesh network 109 that "Apples are 50% off for the rest of the day." The advertisement is available to users who live nearby the market. In another example, a user browses an advertisement for a new printer on a wireless node 101a. In the browsing activity, a code attached to the advertisement is stored in the awareness services module 111. Upon searching and finding such a code, a nearby electronics store sends the user an offer to sell the printer with a 10% discount.

In a sixth use-case, an application automatically creates an activity log based on the awareness information associated with a user. For example, the application records the people the user meets along with other awareness information such as when, where, context, etc. The user then meets a person while walking on the street. The person looks familiar but the user does not recall the person's name or how the user knows the person. The wireless node 101a running the application reports that the person's name is David and that the user met him at a soccer match one year ago in London.

In a seventh use-case, an application provides the capability to initiate local discussion threads and group chats over the ad-hoc mesh network 109. For example, the supporters of a football team form a community over the ad-hoc mesh network 109 wherein community members can send short text messages (e.g., of small enough size to be sent directly over the ad-hoc mesh network 109) that can be received and read only by the fan club community members of that particular team.

Figure 2A:
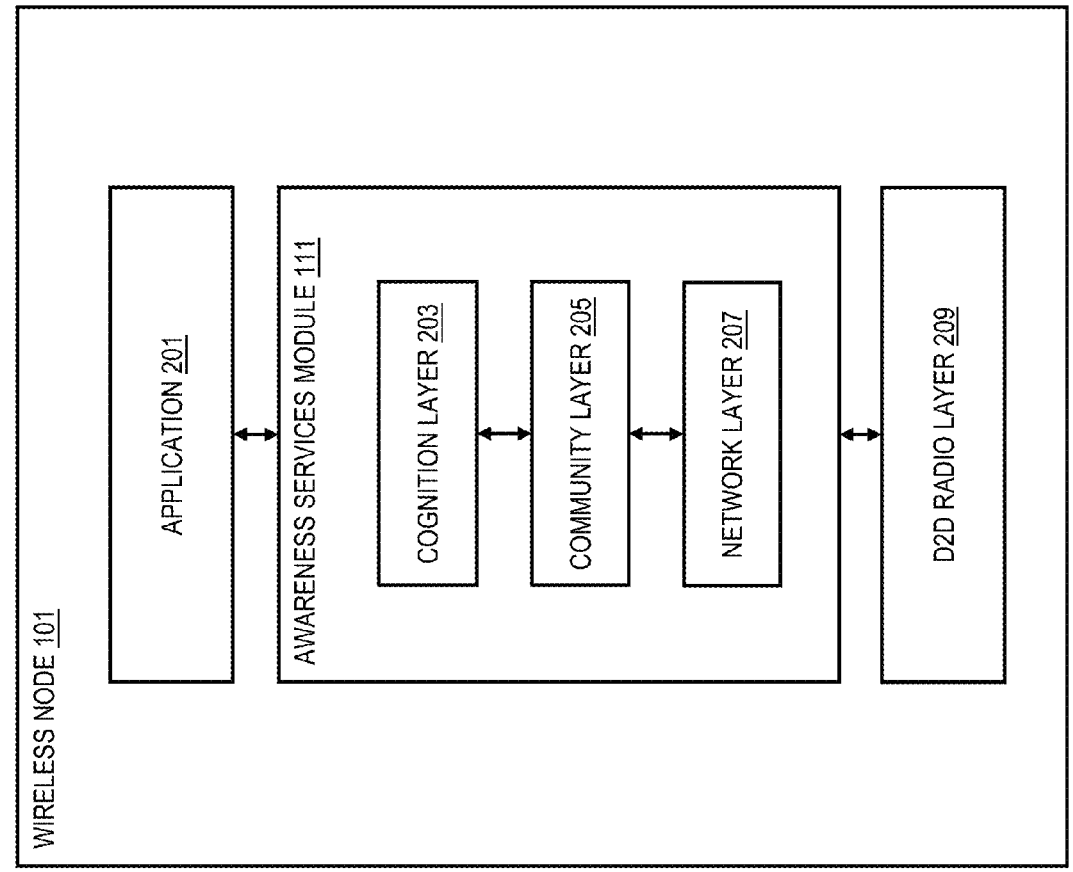
FIG. 2A is a diagram of the components of a wireless node including an awareness services module, according to an exemplary embodiment.

FIG. 2A is a diagram of the components of a wireless node including an awareness services module, according to an exemplary embodiment. FIG. 2A is described with respect to FIGS. 2B-2E which are diagrams of the components of an awareness services module, according to various exemplary embodiments. As shown in FIG. 2A, a wireless node 101 includes one or more components for sharing awareness information within the ad-hoc mesh network 109. It is contemplated that the functions of these components may be combined in one or more components or performed by other components of equivalent functionality. In this embodiment, the wireless node 101 includes an application 201 that uses awareness information to provide various services and functions including social networking, location-based services, presence information, context determination, advertising functions, etc. The application 201 may interact with the awareness services module 111 to obtain or share awareness information.

Figure 2B:
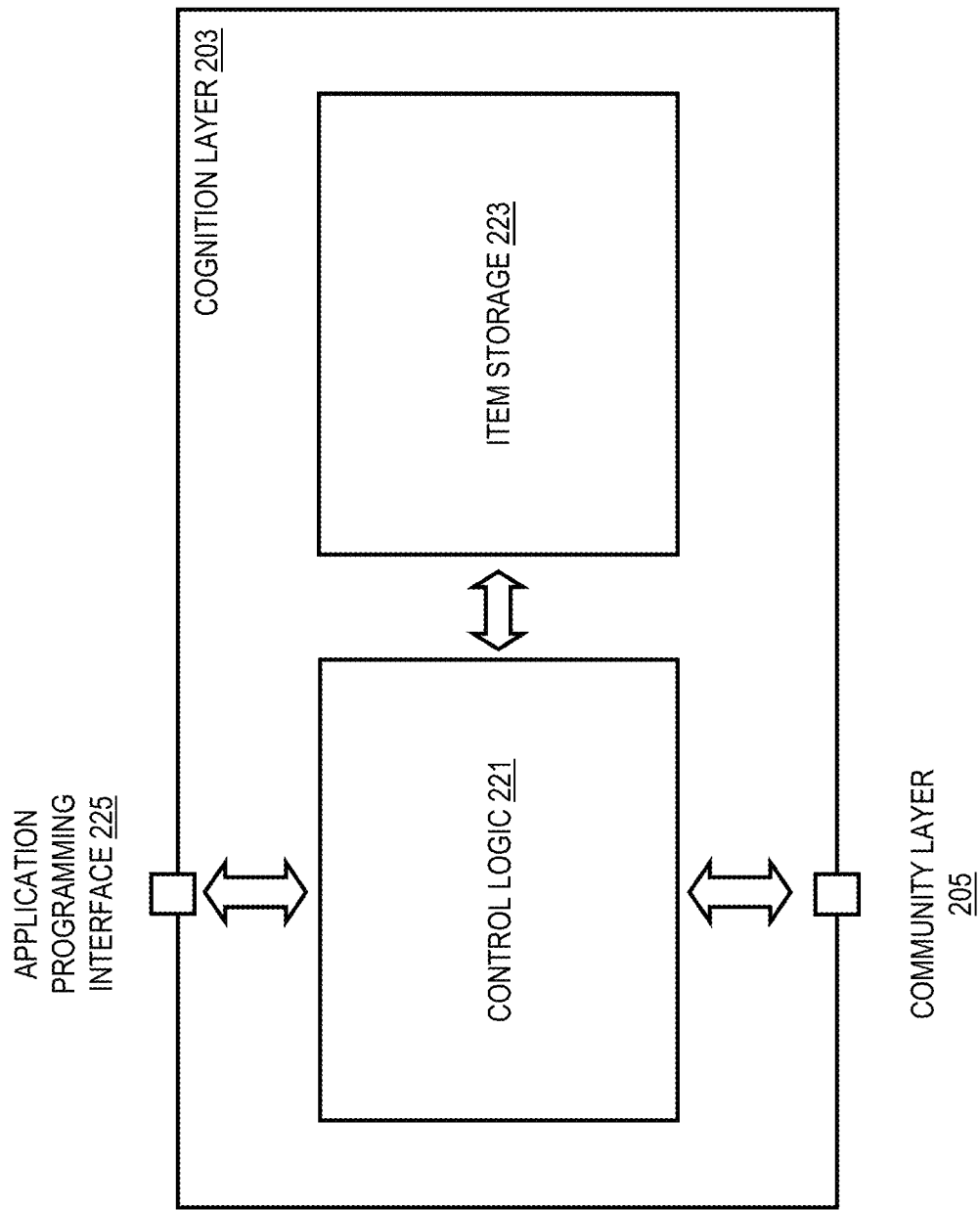
FIGS. 2B-2E are diagrams of the components of an awareness services module, according to various exemplary embodiments.

By way of example, the awareness services module 111 includes three layers: a cognition layer 203, a community layer 205, and a network layer 207. The cognition layer 203 is the highest control layer for sharing awareness information. As shown in FIG. 2B, the cognition layer 203 includes a control logic 221 and item storage 223. The control logic 221, for instance, provides the logic for creating, publishing, querying, and receiving awareness information over the ad-hoc mesh network 109. The control logic 221 can store the information that it either creates or receives in the item storage 223. It is contemplated that the item storage 223 may be of sufficient size to store all or a portion of the information that flows through the wireless node 101 over a configurable period of time (e.g., days, months, or years).

In exemplary embodiments, the control logic 221 enables querying and dissemination of awareness information by initiating the flooding of the query or information to neighboring wireless nodes 101 within the ad-hoc mesh network 109. For example, upon receiving a query, the wireless nodes 101 in the local neighborhood that has the queried information reply to the querying node automatically. In exemplary embodiments, the reply information is also automatically stored in the item storage 223 of each wireless node 101 through which the propagating reply passes. Moreover, the reply to a query may result in return of a pointer to specific content relevant to the query rather than the content itself under certain circumstances (e.g., when the specific content is large in size). It is contemplated that the reply may contain direct content if the content is relatively small (e.g., a few tens bytes of information). By using a pointer, the system 100 minimizes the data traffic that flows through the ad-hoc mesh network 109. The user may then access the content via the pointer (e.g., a universal resource locator (URL) address, IP address) via a more appropriate communication protocol (e.g., IP) and/or means of communication (e.g. infrastructure networks). The receipt of the pointer (e.g., IP address) may automatically trigger the transfer of the content using, for instance, the communication protocol associated with the pointer. In the case of broadcasting or publishing information, any wireless node 101 through which the published information propagates may store the information in item storage 223 of the wireless node 101.

In other exemplary embodiments, awareness information can also be published directly by flooding an awareness message. Such a push mode for the dissemination of awareness information can be used to support some applications (e.g. advertising or group chatting) over the ad-hoc mesh network 109.

It is recognized that privacy and anonymity may be of concern to users of the system 100. Accordingly, the control logic 221 provides mechanisms for ensuring privacy and anonymity. For example, the control logic 221 can prevent the transmission of intimate information when the number of neighboring wireless nodes is small to prevent the possibility of inferring identity. As used herein, the term "intimate information" refers to information directly related to the user, e.g., the user's habits, tastes, or preferences (musical preferences, favorite restaurants, etc.).

The control logic 221 may also periodically broadcast decoy queries and replies to make tracking an individual wireless node 101 more difficult. Since an outside observer does not know the authentication key associated with a community, the observer cannot distinguish a valid message from a fictitious one. Accordingly, by observing decoy messages, the observer is likely to detect presence of a private community when there is not one. Additionally, the control logic 221 enables to user to define filters for incoming information (e.g., filter advertisements) and how these filters would work (e.g., ignore the information completely, relay the information but do not store, etc.). It is also contemplated that the user can direct the control logic 221 to control the user's visibility on the ad-hoc mesh network 109 (e.g., no visibility, visible only to a certain community or other user) to maintain privacy. As another mechanism for protecting privacy, the control logic 221 can interact with the community layer 205 to anonymize a specific message and corresponding identifiers as described below with respect to the community layer 205.

Because one of the goals of the system 100 is to provide a mechanism for anonymous spreading of awareness information, it is recognized that undesired or unsolicited messages (e.g., spam messages) may become a problem. To address this problem, the control logic 221 may obtain, for instance, information from the lower system layers of the awareness services module 111 about the traffic load and current average power consumption. If the traffic load is medium or high (meaning that also power consumption related to system 100 is medium or high) restrictions may be set for the frequency at which flooding messages are sent by the control logic 221. It is also contemplated, that the neighboring peer nodes 101 can be configured to not forward any flooding messages originating from a node 101 neglecting such message restrictions.

The cognition layer 203, together with the community layer 205, provide an application programming interface (API) 225 to enable an application 201 to access the functions of the control logic 221 and the item storage 223. In exemplary embodiments, the API 225 enables application developers to have uniform and easy access to functions related to sharing awareness information over the ad-hoc mesh network 109. It is contemplated that the API 225 is extensible to accommodate any application designed to access or use awareness information. The applications in the various nodes 101 do not have to be the same or mutually compatible. It is sufficient that the applications use the API correctly to be able to publish and search awareness information in the surrounding nodes 101.

The cognition layer 203 also has connectivity to the community layer 205. The community layer 205 controls the formation and cataloging of communities of wireless nodes 101 within the ad-hoc mesh network 109. By way of example, a user may create any number of communities for sharing awareness information. It is contemplated that a community may be either a peer community (e.g., any wireless node 101 may join), a personal community (e.g., a wireless node 101 may join only if invited), or the open local community that consists of all nodes in the local neighborhood. In exemplary embodiments, the messages that traverse between the wireless nodes 101 within the ad-hoc mesh network 109 belong to one of these three community types. Communities can either be private (messages are encrypted) or public (no encryption used). In exemplary embodiments, membership and status in a community affect how the wireless node 101 shares awareness information (see the discussion with respect to FIG. 2G for additional details of community membership).

Figure 2C:
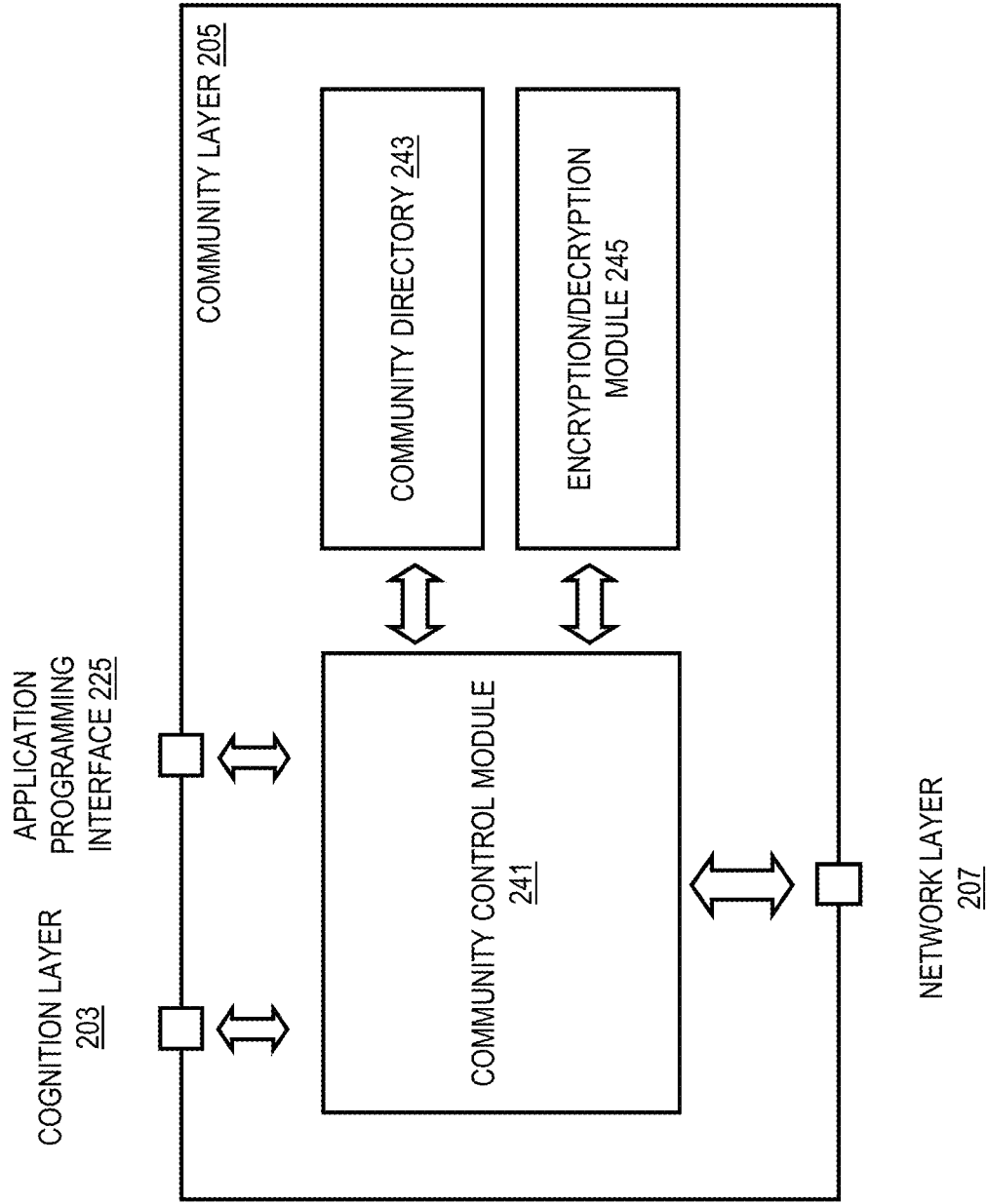

Furthermore, a community may be created for any purpose or duration (e.g., a permanent work community, a permanent community of friends, a temporary community of concert goers lasting only the duration of the concert, etc.). As shown in FIG. 2C, the community layer 205 includes a community control module 241, a community directory 243, and an encryption/decryption module 245. The community control module 241 provides the logic for creating, joining, managing (e.g., updating membership, configuring settings and preferences, setting privacy policies), and deleting communities. The module 241 also provides part of the API 225.

In exemplary embodiments, the community control module 241 assigns a unique community identification number (CID) to each community for use within the ad-hoc mesh network 109. The control module 241 can also generate authentication keys K associated with the CID to, for instance, authenticate users who wish to join the community or authenticate messages directed to the community. For example, a wireless node 101 may invite another wireless node 101 to join a community by transferring the CID and authentication keys associated with the community to the other wireless node 101. It is contemplated that the transfer of the CID and corresponding authentication key may occur using short range radio or using another secure mechanism (e.g., short message service (SMS) or electronic mail). It is noted that both peer and personal communities use a CID and corresponding K, whereas the open local community either can use a predetermined value for CID (e.g., zero) or does not use the CID at all.

To ensure privacy (as discussed above), the community control module 241 interacts an encryption/decryption module 245 to anonymize the CID when including the CID in messages over the ad hoc mesh network 109. For example, a wireless node 101 may direct a query to a specific community using an anonymized CID (e.g., a pseudonym) associated with the community in lieu of the actual CID. In exemplary embodiments, multiple anonymized CIDs may be used to represent a single community. In this way, it is more difficult to identify queries corresponding to a particular community by monitoring traffic within the ad hoc mesh network 109. From the perspective of an outside observer, the anonymized CIDs look random. In addition, the encryption/decryption module 245 may encrypt or decrypt message data using, for instance, a temporary key that is periodically derived from the authentication key K associated with the CID. These measures hinder the discovery of the CID by outsiders that do not have the authentication key. By way of example, the community layer 205 inserts a special header into the messages that it receives from the cognition layer 203. The special header, for instance, contains a list of anonymized community identifiers corresponding to the communities to which the message is relevant.

Figure 2D:
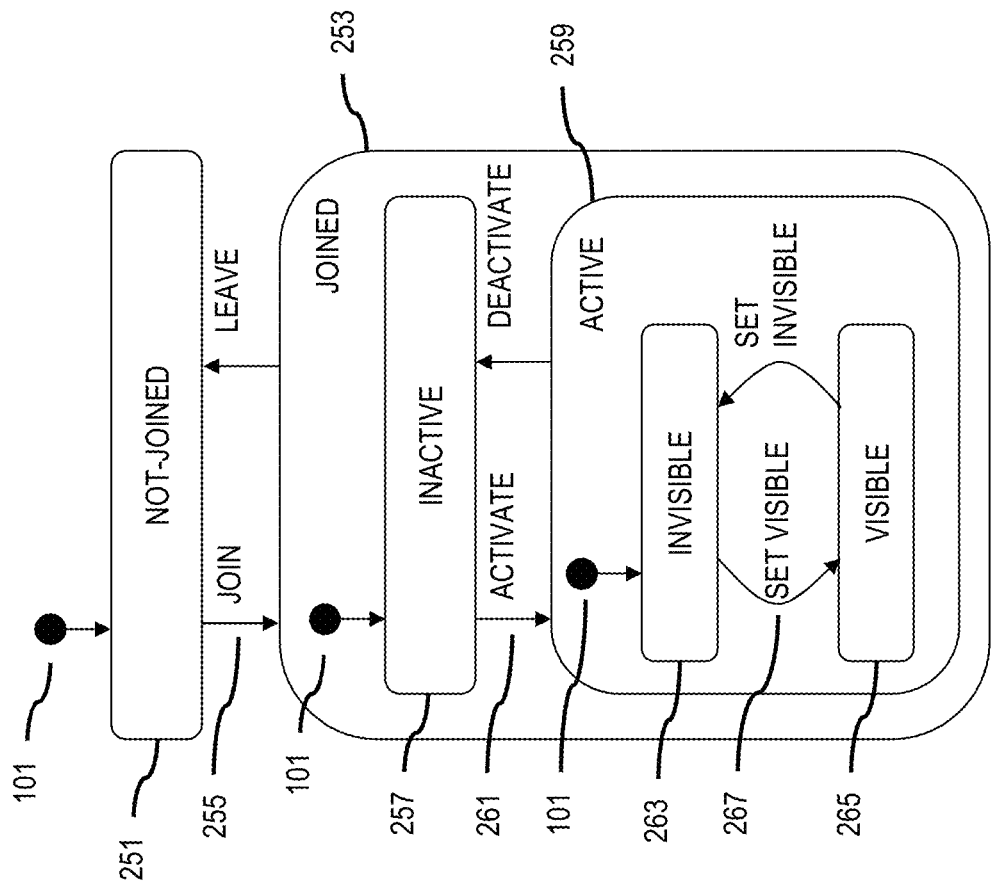

FIG. 2D is a state diagram of the effect of community membership and status on sharing awareness information, according to an exemplary embodiment. As shown in FIG. 2D, a wireless node 101 may be in either one or two states (e.g., a not-joined state 251 and a joined state 253) with respect to membership in a community within the ad-hoc mesh network 109. The application 201 of wireless node 101 issues, for instance, a command 255 to either join or leave a community to transition between the not-joined state 251 and the joined state 253. When the wireless node 101 is in the not-joined state 251 with respect to a community, the wireless node 101 has no information (e.g., CID and associated authentication keys K) about the community and cannot access messages directed to the community. When the wireless node 101 is in the joined state 253, the community layer 205 receives the CID and possibly one or more authentication keys associated with the community. In one embodiment, authentication keys are provided when membership in the community is by invitation or otherwise restricted (e.g., when the community is a personal community or a private community). Accordingly, the community layer 205 will be able to encrypt outgoing community specific messages and to decrypt incoming community specific messages.

When the wireless node 101 is in the joined state 253, the wireless node 101 may also be in either an inactive state 257 or an active state 259. To transition between the inactive state 257 and the active state 259, the application 201 may issue a command 261 to either activate or deactivate the joined state 253 via the application programming interface 225. When the wireless node 101 is in the inactive state 257, the community layer 205 abandons the message even though it is a member of the community. In certain embodiments, the wireless node 101 may also be invisible to other members of the community while in the inactive state 257. For example, the wireless node 101 may enter the inactive state 257 when it temporarily does not want to receive or share information with the community. When the wireless node 101 is in the active state 259, the community layer 205 encrypts and decrypts community messages as usual for private communities, and enables all outgoing and incoming community specific messages for public communities (e.g., communities with no restrictions on membership).

Within the active state 259, the wireless node 101 may also be in either an invisible state 263 or a visible state 265. To transition between the invisible state 263 and the visible state 265, the application 201 issues a command 267 to set either the visible or invisible state. When in the invisible state 263, the community-specific identity (e.g., a user alias) associated with the wireless node 101 cannot be queried by other members of the community. For example, in the invisible state 263, the community layer 205 continues to receive and send community messages without its identity known to other community members. When in the visible state 265, the identity of the wireless node 101 can be queried by other members of the community.

In various embodiments, the community directory 243 of the community layer 205 maintains, for instance, information on the communities that the user has joined. Such information contains, at least, the community identification (CID). Additionally, it may contain public and/or private authentication keys (K) of the joined communities and a list of anonymized community identifiers for each community. The community control module 241 may periodically recalculate the list of anonymized CIDs. By way of example, the community layer 205 inserts a header into the message it receives from the cognition layer 203. The header contains, for instance, a list of anonymized community identifiers identifying the communities to which the message is relevant.

It is contemplated that a special personal community can be reserved for tracking new bonds or relationships created between users. Consider, for example, that user A meets user B for the first time and wants to create a radio bond between the mobile devices corresponding to each user. In one embodiment, user A can initiate the creation this bond with user B by transferring to user B (e.g., by using a secure transfer mechanism) the CID and the public K of user A's personal "new bonds" community. Similarly, user B may give user A similar credentials corresponding to user B's "new bonds" community. Once the credentials are exchanged and the bond has been created, user A may find user B over the ad-hoc mesh network 109 by searching for members of user A's "new bonds" community. In other words, with a simple search of a single community, user A can search for all the people in user A's local neighborhood with whom she has created a bond. This requires that a high number of community CIDs and Ks can be stored in the community directory 243. Also, an effective lookup of the community directory 243 must be provided. There are many existing and good solutions for such efficient lookup.

As the user creates new bonds, the number community CIDs and Ks stored in the user's community directory 243 can grow quite large. Accordingly, to enable effective search of a large number of communities, the community layer 205 may generate a special community search message to initiate the search. For example, the special community search message contains, at least in part, a list of anonymized community identifiers corresponding to the communities to be searched. To protect the privacy, the community layer 205 can generate a new set of anonymized community identifiers for each community search message. If the community layer 205 finds a match to any of the anonymized community identifiers in any of the neighboring nodes 101 that receives the search message, the community layer 205 generates a reply message that may contain the alias of the user in that community or other community specific information. The reply message may be encrypted with the encryption key of the community.

Figure 2E:
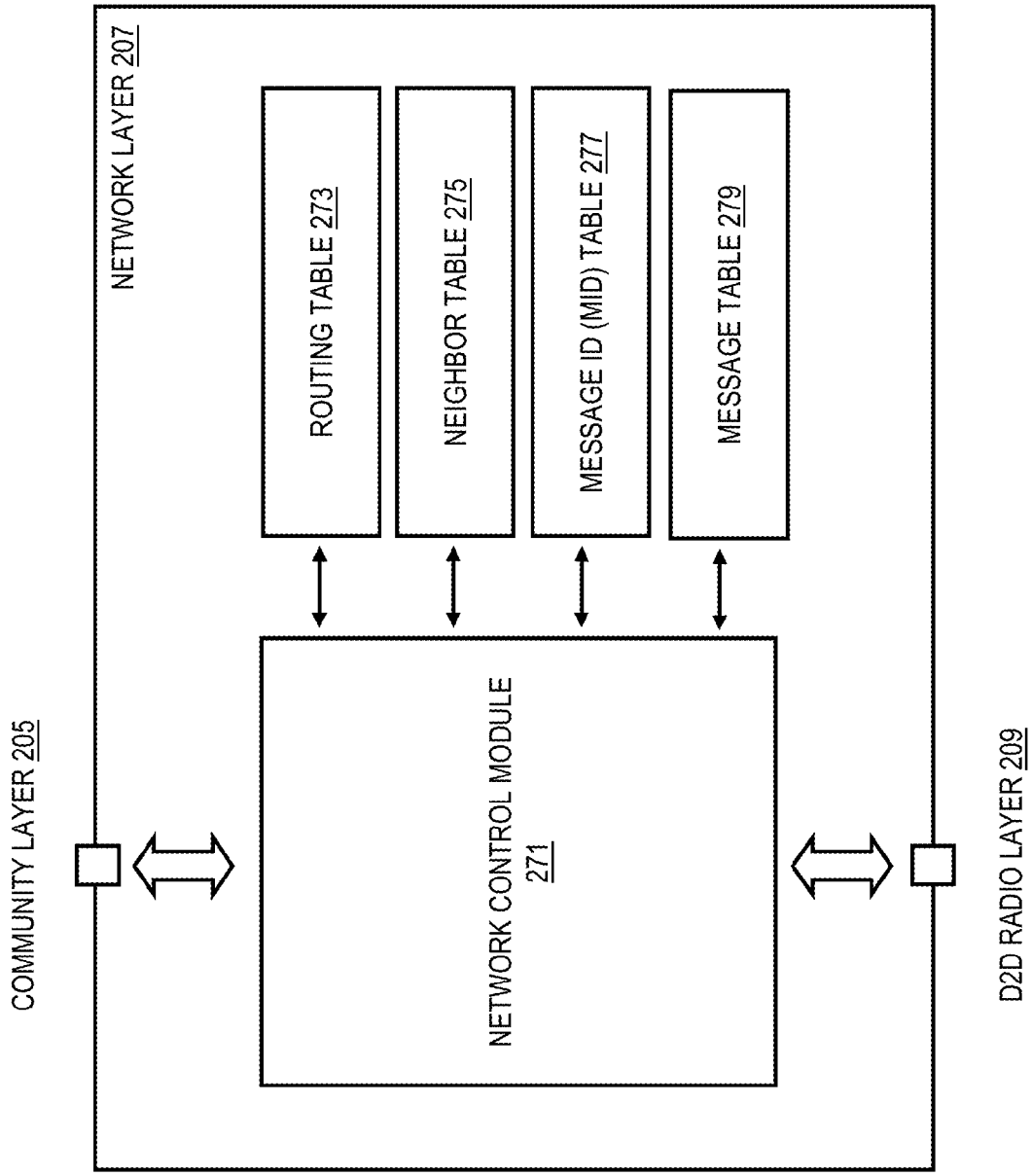

As shown in FIG. 2C, the community layer 205 has connectivity to the cognition layer 203 above and the network layer 207 below. The network layer 207 manages the rebroadcasting of received flooding messages and the routing of the unicast (typically reply) messages received by the wireless node 101. FIG. 2E depicts a diagram of the components of the network layer 207, according to an exemplary embodiment. The network layer 207 includes a network control module 271, routing table 273, neighbor table 275, message identification (MID) table 277, and message table 279. The network control module 271 directs the broadcasts of messages and information by managing and updating the routing table 273, neighbor table 275, MID table 277, and message table 279. In certain embodiments, the network control module 271 may also assist in protecting the privacy and anonymity of users by periodically changing the network layer identification associated with the wireless node 101. It is noted that making such a change in the network layer identification between queries does not cause routing problems for replies because the routing information is recreated by each query in the ad-hoc mesh network 109.

In exemplary embodiments, the network layer 207 may insert a header into messages it receives from the community layer 205 to, for instance, direct flooding and routing of the received messages. The structure of this network layer message header 281 is discussed with respect to FIG. 2F. FIG. 2F is a diagram of the data structure of a network layer message header, according to an exemplary embodiment. As shown, the message header 281 contains the following fields: (1) a TX field 282 to identify the transmitter node ID (NID) of the last transmitting node 101; (2) a SRC field 283 to identify the source node ID of the node 101 that originated the message; (3) a DST field 284 to identify the destination source ID of the intended recipient of a unicast (reply) message (e.g., this field is give a value of zero when the message is a flooding messages); (4) a MSN field 285 to identify the message sequence number assigned by the source node; and (5) a hop count field 286 that is incremented by one by each node 101 that transmits the message. In certain embodiments, the message header 281 may also contain the following optional fields: (6) a geographical limit field 287 to designate the extent of the physical over which the message is intended to propagate (e.g., the geographical limit field 287 may contain a geographical position of the source node and a maximum flooding radius from that position); (7) a temporal limit field 288 (e.g., the temporal limit field 288 may contain the time when the message becomes obsolete and should be dropped); and (8) a context limit field 289 that defines the context beyond which the message is not intended to propagate (e.g. a message related to a particular concert is not intended to extend beyond the concert venue).

Returning to FIG. 2E, the network layer 207 also contains a routing table 273. In exemplary embodiments, the routing table 273 contains a listing of the node identification number (NID) of the originating wireless node 101 (e.g., source NID) and the NIDs of the last known transmitters of the message. The purpose of the routing table is to enable the routing of the reply messages (e.g., unicast messages) back to the querying node that originated the query through a flooding message. As the message propagates through the ad-hoc mesh network 109, each subsequent wireless node 101 that receives the message adds the NID of the last transmitter to the routing table to record the next hop neighbor towards the source node. The source node is marked as the destination node (DST) in the routing table. Also the message sequence number of the message is recorded. The update of the routing table 273 is coordinated by the network control module 271. As shown in Table 1, the routing table 273 lists the destination NID, the transmitter NIDs associated with wireless nodes 101 that have rebroadcasted a message and the MSN of the message.

TABLE 1

| Destination NID | Transmitter NIDs | Message Sequence Number |
|---|---|---|
| $DST_1$ | $TX_{11}, TX_{12}, \ldots, TX_{1M}$ | $MSN_1$ |
| $DST_2$ | $TX_{21}, TX_{22}, \ldots, TX_{2N}$ | $MSN_2$ |
| $\ldots$ | $\ldots$ | |
| $DST_S$ | $TX_{S1}, TX_S, \ldots, TX_{ST}$ | $MSN_S$ |

The neighbor table 275 contains a list of the neighboring wireless nodes 101 and an estimate of their relative radio distance (see Table 3). It is contemplated that the observed signal strength together with the known transmitting power of a neighboring wireless node 101 is an indicator of the proximity of the wireless node 101 and can be used to calculate the relative radio distance. The relative radio distance of the node from which the message was last received is then used as a criterion for whether or not the wireless node 101 retransmits a received message. For instance, a higher signal strength indicates closer proximity to the wireless node 101. The network control module 271 monitors the signal strengths of neighboring nodes 101 as the module 271 receives messages from nearby devices and uses it to estimate the relative radio distance (e.g., proximity of the transmitting node 101). It is also contemplated that the network control module 271 may use any other mechanism for estimating the relative radio distance of neighboring nodes (e.g., estimating location using global positioning satellite receivers or other positioning techniques).

In certain embodiments, the network control module 271 uses the proximity information to direct the routing and transmission of messages over the ad-hoc mesh network 109. For example, the system 101 can reduce the potential for overloading the ad-hoc mesh network 109 by implementing a smart flooding scheme whereby only a few nodes 101 retransmit a flooding message. Whether a node 101 retransmits a flooding message can be dependent on the relative distance group (e.g., "very near", "near", or "far") to which the node 101 that is the transmitter of the message belongs. More specifically, if the transmitting node 101 is in the "far" or "near" group, the receiving node 101 can retransmit the flooding message. If the transmitting node 101 is in the "very near" group, the receiving node 101 does not retransmit the flooding message. For each broadcast message received from a node in either the "far" or "near" group, the network control module 271 assigns a random delay time for relaying or rebroadcasting. The delay period, for instance, exhibits a distribution function based on the estimated relative radio distance as a way to randomize the delay period before transmission. The distribution should be chosen in such a way that the random delay is larger for those nodes that are "near" than for those that are "far." This favors, for instance, nodes 101 that are further away to relay the flooding message forward, which results in better flooding efficiency (smaller total number of transmissions). The use of a random delay time also prevents the unintended synchronization of message broadcasts as the message propagates over the ad-hoc mesh network 109. For example, unintended synchronization of the message broadcasts may result in too many nodes 101 sending broadcasting (i.e., flooding) messages over the ad-hoc mesh network 109 at exactly the same time. Additionally, the delay time provides an opportunity for the network control module 271 to monitor and count rebroadcasts of the message by other neighboring wireless nodes 101.

TABLE 2

| Transmitter NID | Relative Radio Distance |
|---|---|
| $TX_1$ | $D_1$ |
| $TX_2$ | $D_2$ |
| $\ldots$ | $\ldots$ |
| $TX_T$ | $D_T$ |

The MID table 277 contains a list of received messages. As the wireless node 101 receives messages from neighboring nodes over the ad hoc mesh network 109, the network control module 271 uses the MID table to check whether the message has been received previously by, for example, comparing the MIDs in the MID table 277 to that of the received message. The MID table 277 also contains a flag indicating whether a message has been transmitted by the node 101 and the time when the entry was last updated. In exemplary embodiments, the MID is the tuple (SRC, MSN), where SRC is the NID of the source node and MSN is a message sequence number assigned by the source node. In this way, the MID is a unique identifier of each message that propagates in the network 109. The network control module 271 makes an entry in the MID table 277 for all new messages that it receives. If the message has been scheduled for transmission, the module 271 increments the message counter in the message table (see Table 4).

TABLE 3

| MID | Sent flag | Time of reception |
|---|---|---|
| $(SRC_1, MSN_{11})$ | "SENT" | $t_{11}$ |
| $(SRC_1, MSN_{12})$ | "NOT SENT" | $t_{12}$ |
| $\ldots$ | $\ldots$ | $\ldots$ |
| $(SRC_2, MSN_{21})$ | "NOT SENT" | $t_{21}$ |

The message table 279 contains messages that the network control module 271 has scheduled to transmit. For example, as the node 101 receives a flooding message that the network control module 271 schedules for transmission, the module 271 updates the message table to include the message in the message table 279. Each entry in the message table 279 contains the message itself, the time when the message is scheduled to be sent, and the number of receptions of the same message by the node 101 (see Table 4). In exemplary embodiments, a message is not relayed over the ad-hoc mesh network 109 if the number of times the message has been received exceeds a predefined limit. For example, a message has the initial count of 0. In this example, as a wireless node 101 in the neighborhood is observed to transmit the message, the message count associated with the message is increased. When the maximum message count is reached, the network control module 271 removes the message from the message table 279. The transmitter of each message is also associated with an estimated relative radio distance (D) indicating whether the transmitting node is within close proximity of the wireless node 101 (e.g., transmitting node 101 is in the "very near" relative radio distance group) or far from the wireless node 101 (e.g., transmitting node 101 is in the "far" relative radio distance group). If the relative radio distance associated with the transmitting node indicates that the transmission of the message occurred "very near," the wireless node 101 would not have to relay the message because it is assumed, for instance, that most of the other neighboring wireless nodes 101 have already received the same message. By taking into account the relative radio distances of neighboring nodes, the described smart flooding functionality leads to, on average, each flooding message being received for a few times by each node 101 independent of the node density. The number of times a message is received by any one node 101 affects the scalability of the network 109.

If the received message, however, is a unicast reply message that was addressed to the receiving node 101, the network control module 271 checks whether the destination node 101 can be found in the routing table 273 (e.g., can be found from the destination field in the reply message, or obtained from the source field of the query by the replying node). If found, the routing table entry will give the NID of the neighboring node to which the reply message will be sent in the next opportunity. If the unicast transmission is not successful, the next entry for the same DST will be used as the next try. If the received message is a unicast reply message that was not addressed to the receiving node, and no acknowledgment from the intended receiver node was heard, the node will store the message in the message table 279 for scheduled retransmission. It is noted that unicast messages or acknowledgement messages that are not addressed to the node 101 are normally received D2D radio layer 209 (see discussion of the D2D radio layer 209 below) but not by the awareness services module 111. However, under certain circumstances, the D2D radio layer 209 can provide such messages to the awareness services module 111 to schedule for retransmission. For example, if no successful unicast of the same message is observed by the time when the message is scheduled to be transmitted, the node 101 will transmit the unicast or acknowledgement message to the intended recipient found from the routing table 273 associated with the message. In this way, the nodes 101 that are not the intended recipients of the reply messages can assist in routing the message forward towards the correct destination.

TABLE 4

| Message | Time to send | Received msg count |
|---|---|---|
| $MSG_1$ | $t_1$ | $C_1$ |
| $MSG_2$ | $t_2$ | $C_2$ |
| ... | ... | ... |
| $MSG_M$ | $t_M$ | $C_M$ |

As shown in FIG. 2A, the awareness services module 111 has connectivity to a device-to-device (D2D) radio layer 209. The D2D radio layer 209 enables the formation of the ad-hoc mesh network 109 and sharing of awareness information using, for instance, short range radio technologies such WLAN and Bluetooth®. It is contemplated that the D2D radio layer 209 may use any wireless technology for communication between devices over short ranges. The radio technology, for instance, enables each wireless node 101 within the ad-hoc mesh network 109 to broadcast messages in a connectionless way to the neighboring nodes 101 that are within radio range. As used herein, the term "connectionless" means the wireless nodes 101 need not use two-way signaling to establish a communication channel before broadcasting a message. In exemplary embodiments, the D2D radio layer 209 may include multiple radios using one or more different technologies or protocols (e.g., WLAN and Bluetooth® simultaneously). A wireless node 101 configured with multiple radios may act as a gateway node to span two or more sub-networks serviced by the different wireless technologies. In this way, messages broadcast on one sub-network may be propagated to another sub-network.

Figure 2G:
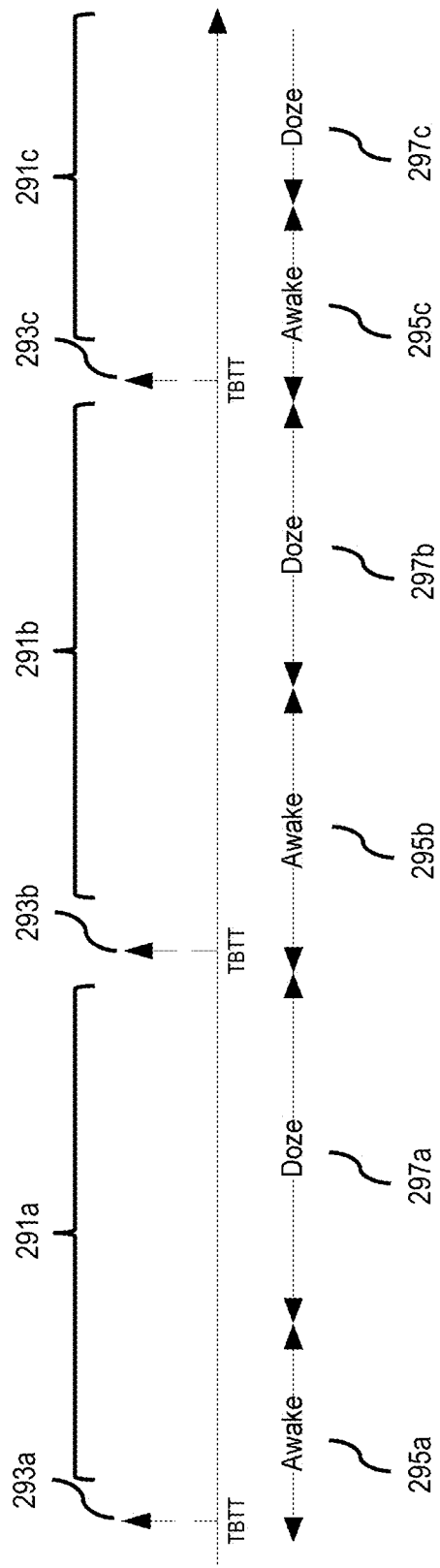
FIG. 2G is a diagram depicting a power saving scheme of a device-to-device radio layer, according to an exemplary embodiment.

FIG. 2G is a diagram depicting a power saving scheme of a device-to-device radio layer, according to an exemplary embodiment. The small amount of awareness data as well as the low latency requirements of the system 100 enables the operation of the D2D radio layer 209 in a way that leads to low power consumption. As shown in FIG. 2G, the D2D radio layer 209 may have beaconing periods $291a$-$291c$ delineated by target beacon transmission times (TBTTs) $293a$-$293c$. In exemplary embodiments, the D2D radio layer 209 may operate in a time-synchronized manner and utilize only a fraction of the time for active communication (e.g., during awake periods $295a$-$295c$). During the rest of each beaconing period 291, the D2D radio layer 209 is in, for instance, a power-saving or dozing mode (e.g., during doze periods $297a$-$297c$). For example, each beaconing period 291 can be on the order of hundreds of milliseconds and each awake period 293 only a few milliseconds, leading to effective radio utilization of approximately one percent. It is contemplated that for situations, where the number of nodes 101 is very large (such as during mass events), time-wise radio utilization can increase up to 100 percent momentarily (e.g., awake period 293 equals active transmission period 291). At times of low traffic (for example at night), the radio utilization can be decreased to, for instance, 0.1 percent, by utilizing every tenth awake period 293 while still maintaining synchronization.

Figure 9:
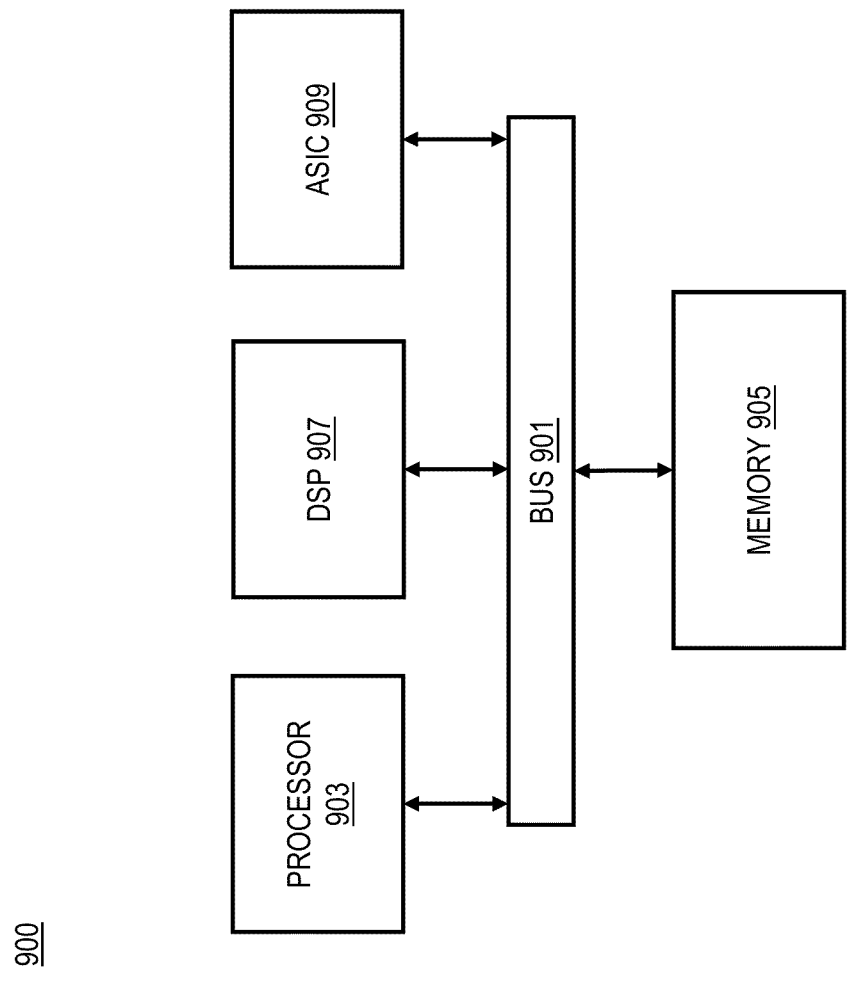
FIG. 9 is a diagram of a chip set that can be used to implement an embodiment of the invention.

In exemplary embodiments, the low latency requirements also enable saving power in the host processor (e.g., as depicted in FIG. 9). For illustration, the following description refers to the components of exemplary chip set of FIG. 9. The D2D radio layer 209 is typically implemented in the ASIC module 909, whereas the functionalities of the awareness services module 111 can be implemented either in the ASIC 909 or the processor 903. If the functionalities of the awareness services module 111 are implemented in the processor 903, power consumption is reduced by, for instance, having ASIC 909 wake up the processor 903 as infrequently as possible. By way of example, the periodic operation of the D2D radio layer 209 explained above enables the ASIC 909 to collect all messages and send them to the processor 903 at a frequency of once per active transmission period 291. The processor 903 then processes all received messages and calculates new messages to be sent for the next active transmission period 291. The processor 903 then sends the messages to the ASIC 909 for transmission. Using this process, a flooding message can make one hop (e.g., travel from one node 101 to another node 101) per period 291, which is fully acceptable for awareness information. In contrast, potential delays of hundreds of milliseconds are not possible, for example, for voice traffic, and these kinds of power savings cannot therefore be achieved in other communication systems transporting delay-sensitive traffic.

FIGS. 3A and 3B are flowcharts of processes for generating a flooding message and receiving a flooding message over an ad-hoc mesh network, respectively according to various exemplary embodiments. In one embodiment, the awareness services module 111 performs the process 300 of FIG. 3A and the process 320 of FIG. 3B and is implemented in, for instance, a chip set including a processor and a memory as shown in FIG. 9. With respect to the process 300, it is assumed that control logic 221 has received a service request to generate a flooding message through, for instance, the application programming interface 225 from an application 201. As used herein, a "flooding message" is a message that is broadcast over the ad-hoc mesh network 109 to neighboring wireless nodes 101 for propagation from node to node. In step 301, the awareness services module 111 generates the body (e.g., the query or content to be published) of the flooding message in response to the service request. By way of example, the flooding message may be either a query (e.g., for pulling information from the ad-hoc mesh network 109) or a publish message (e.g., for pushing information to the ad-hoc mesh network 109). The type of message (e.g., query or publish message) depends on the nature of the service request and the application 201 generating the request.

After generating the body of the message, the awareness services module 111 (e.g., the community layer 205 and the network layer 207) prepares the message by adding the headers (e.g., network layer header 281) to direct the routing of the message as discussed previously with respect to FIG. 2F (step 303). For example, the header may specify a maximum message count (e.g., hop count), a geographical limit for the flooding message, a temporal limit, or other context limit. Preparing the message for broadcast also includes, for instance, assigning a message sequence number 295 (MSN) to the flooding message and specifying a source NID, destination NID, and/or transmitter NID. The awareness services module 111 initiates broadcast of the flooding message by adding an entry for the generated flooding message in the MID table, with the sent flag set to "not sent," and forwarding the message to the D2D radio layer 209 for broadcast over the ad-hoc mesh network 109 (step 305). After broadcasting, the awareness services module 111 may determine whether the flooding message should be rebroadcasted over the ad-hoc mesh network 109 (step 307). For example, the application 201 may direct the awareness services module 111 to rebroadcast the flooding message based by monitoring and counting the number times the originating node 101 is able to observe rebroadcasts of the flooding message by neighboring nodes 101. The observed rebroadcasts, for instance, serve as an acknowledgement that the neighboring node 101 that is retransmitting the flooding message has successfully received the flooding message. In one embodiment, the awareness services module 111 determines whether the observed rebroadcasts is of the same flooding message by comparing the MID of the observed message and the original flooding message (step 309). If, after a predetermined period of time, no rebroadcasts are observed, the awareness services module can rebroadcast the flooding message (e.g., by returning to step 305 and repeating as necessary). It is contemplated that the application 201 or the awareness services module 111 can define the number of rebroadcasts to attempt. After reaching the rebroadcast limit, the awareness services module 111 notifies the application 201 of the rebroadcasting status and suspends additional rebroadcasts (step 311).

FIG. 3B is a flowchart of a process for receiving a flooding message over an ad-hoc mesh network, according to an exemplary embodiment. In step 321, the awareness services module 111 receives a flooding message from a neighboring wireless node. The flooding message may, for instance, contain published awareness information, or a query. In exemplary embodiments, the flooding message may contain a pointer (e.g., URL or IP address) to specific information or content rather than the actual information or content itself to minimize data traffic over the ad-hoc mesh network 109. As discussed previously, in certain embodiments, the flooding message may contain content if the content is relatively small in size (e.g., a few bytes of information). After receiving the pointer or the content, the wireless node 101 may access the information or content using another communication protocol (e.g., Internet) or means of communication (e.g. an infrastructure network).

In addition, the information within the flooding message is shared anonymously (e.g., shared without identifying the sender of the information) unless directed otherwise. By way of example, the awareness services module 111 may use any mechanism to share the information anonymously including changing a link layer or network layer identification, preventing transmission of intimate information when the number of neighboring nodes is small, anonymizing information that can be used to identify a user or community, or a combination thereof. For example, by periodically changing a link layer or network layer identification associated with a transmitting wireless node 101, the awareness services module 111 makes it more difficult for an outside observer to determine the identity of the wireless node 101 or its user. The anonymous sharing of information is further protected by preventing the transmission of intimate information with the number of neighboring nodes is small. This reduces the possibility that an outside observer may infer the owner of the intimate information by observing the small community of wireless nodes 101. As another mechanism, the awareness services module 111 can anonymize any identifying information in the flooding message using the process described with respect to the encryption/decryption module 245 of the community layer 205 (e.g., anonymizing the CID).

On receipt of the flooding message, the awareness services module 111 updates the routing table 273 associated with the message and the MID table 277 (step 323). As discussed with respect to FIG. 2E, for each observed source node NID the routing table 273 contains listing of all neighboring nodes that the awareness services module 111 has observed to retransmit the same flooding message (messages with equal MID). For example, the network control module 271 stores the NID of the node from which the message was received as the next entry of the list. This way, the routing table 273 contains redundant next-hop information from the current receiving node towards the source node. If the received flooding message contains a MSN that is larger than that found in the routing table 273, the listing of the next hop neighbors is deleted from the routing table 273 for this destination and the transmitting node is set as the first entry in the next hop list. In exemplary embodiments, the dynamic updating of the routing table 273 based on the flooding messages enables the awareness services module 111 to dynamically create reply routes among wireless nodes 101 within the ad-hoc mesh network 109.

To update the MID table 277, the awareness services module 111 checks whether there is already an entry for the received message. If there is not, the awareness services module 111 adds a new entry for the received flooding message including the time of reception. If there is an existing entry, the awareness services module 111 updates the time of reception. The time of reception is used, for instance, to remove older entries from the MID table.

To update the message table 279, the awareness services module 111 first checks (based on the MID) if the received message already exists in the message table. Existence of the message would mean that the message has been received earlier and is already scheduled for retransmission by the module 111. If the message already exists in the message table 279, the message counter in the message table 279 is also incremented.

The neighbor table 275 contains a list of the neighboring wireless nodes 101 and an estimate of their relative radio distance. In exemplary embodiments, the awareness services module 111 initiates determination of the relative radio distance of neighboring wireless nodes 101 (step 323). In one embodiment, the relative radio distance is estimated by measuring the transmitting power (e.g., a receiver carrier power indication (RCPI) level) of received messages to determine the relative radio distance of neighboring wireless nodes 101. The awareness services module 111 then classifies the neighboring nodes 101 according to their respective relative radio distance or other predefined criteria (step 325). For example, based on the RCPI and, optionally, the observed RCPI history of the neighboring nodes 101, the nodes 101 are ordered by increasing RCPI value. The nodes 101 are then divided into, for instance, one or more distance categories (e.g., three categories): the nodes 101 with the highest RCPI (or RCPI history) values are assigned a relative radio distance of "very near"; the nodes 101 with lowest RCPI (or RCPI history) values are assigned a relative radio distance of "far"; and the remaining nodes 101 are assigned a relative radio distance of "near". The sizes of these three populations are adaptively set by the awareness services module 111 by modifying the RCPI thresholds used for relative distance classification. If the number of neighboring nodes is small, the thresholds should be set in such a way that all the nodes will fall in the "near" category.

It is contemplated that the observed signal strength together with the known transmitting power of a neighboring wireless node 101 is an indicator of the proximity of the wireless node 101 and can be used to calculate the relative radio distance. The relative radio distance of the node from which the message was last received is then used as a criterion for whether or not the wireless node 101 retransmits a received flooding message. For instance, a higher signal strength indicates closer proximity to the wireless node 101. The awareness services module 111 monitors the signal strengths of neighboring nodes 101 as it receives messages from nearby devices and uses it to estimate the relative radio distance (proximity). It is also contemplated that the awareness services module 111 may use any other mechanism for estimating the relative radio distance of neighboring nodes (e.g., estimating location using global positioning satellite receivers or other positioning techniques).

For example, an entry for a neighboring node 101 is maintained in the neighbor table 275, if within a predetermined time window T, the neighboring node 101 has transmitted a message or a beacon signal. In certain embodiments, the time window T is dependent on how quickly the neighboring nodes 101 are moving or changing. For example, if the set of neighboring nodes 101 is changing rapidly, the time window T is shorter; if the set of neighboring nodes 101 is stable, the time window T is longer. It is contemplated that the time window may be dynamically adjusted based on the stability of the set of neighboring nodes 101.

In one embodiment, if the received flooding message is from a neighboring wireless node 101 that is classified in the very near distance category (step 327), the awareness services module 111 cancels retransmission of the flooding message or does not initiate retransmission of the flooding message (step 329). Under this circumstance, the awareness services module 111 assumes that because the flooding message was received from a very near neighboring wireless node 101, the other neighboring wireless nodes 101 most likely have also received the flooding message. Therefore, retransmission of the flooding message to immediate neighboring nodes 101 is likely not needed. In this way, the awareness services module 111 reduces unnecessary retransmissions over the ad-hoc mesh network 109.

If the neighboring node 101 from which the flooding message was received is not in the very near distance category, the awareness services module 111 determines whether to retransmit the flooding message based on other predefined retransmission criteria (step 331). As part of this determination, the awareness services module 111, for instance, classifies the neighboring wireless nodes 101 into one or more groups based on the criteria. Classification in a particular group may then be used to determine whether that group, for instance will receive retransmission of the flooding message. The retransmission criteria include, for instance, a message hop limit, geographical limit, temporal limit, context limit, or a combination thereof. It is contemplated that the awareness services module 111 may use any other limitation or context as retransmission criteria. In exemplary embodiments, the retransmission criteria reduce the potential for unnecessarily rebroadcasting a flooding message, thereby minimizing data traffic over the ad-hoc mesh network 109. For example, the awareness services module 111 applies the message count limit by checking the hop count field 286 in the received message, which indicates the number of hops the flooding message has traveled over the ad-hoc mesh network 109. Once the message count reaches a predefined limit, the flooding message is dropped and no longer retransmitted. Such a limit prevents messages from travelling without limit. In certain embodiments, the message count limit can override any other limits that the originator of the message may have set.

Similarly, the awareness services module 111 can limit the geographical dispersion of the flooding message by, for instance, comparing the location of the wireless node 101 to the geographical limit 287 of the flooding message. This location information may be obtained as awareness information shared by neighboring wireless nodes 101 or directly obtained from a positioning module or other positioning service accessible by the wireless node 101.

With respect to a retransmission criterion based on a temporal limit, the awareness services module 111 rebroadcasts the flooding message only during the effective time period of the message. For example, a flooding message includes information concerning a concert and is effective only for the duration of the concert. By way of example, the awareness services module 111 accesses a clock service (e.g., resident on the wireless node 101 or external to the wireless node 101) to determine the time and does not retransmit the flooding message if the time is outside the effective time period specified by the temporal limit 298 of the flooding message.

With respect to a retransmission criterion based on a context limit, the awareness services module 111 rebroadcasts the flooding message only if the context limit 289 in the received message matches with that of the receiving node.

Such a context (e.g. location in "Bradbury Mall") may be calculated based on the awareness information received from other mobile nodes or from nodes installed at fixed locations. For example, a flooding message including an advertisement for a store may have its distribution limited to only those wireless nodes 101 that are located within the mall in which the store is located.

Based on application of the retransmission criteria, the awareness services module 111 makes a determination of whether to retransmit the flooding message. If the determination is to retransmit, the awareness services module 111 updates the message table 279 to add the received flooding message to the transmission queue and initiates rebroadcast of the flooding message by, for instance, assigning a retransmission time range to each distance category (step 333). The retransmission range for the near group, for instance, can be calculated based on the number of wireless nodes 101 classified or included in the near group. Similarly, the retransmission range for far group can be calculated based on the number of wireless nodes 101 classified or included in the far group. It is contemplated that the retransmission range can be independently calculated for each defined group. By way of example, the retransmission time range specifies a time period during which the flooding message will be retransmitted to the neighboring wireless nodes 101 within a specific distance category. More specifically, the awareness services module 111 schedules the retransmission of the flooding message according to assigned retransmission time range for each neighboring wireless node 101 (step 335). In this way, the awareness services module 111 can delay or stagger the retransmission of the flooding message to neighboring wireless nodes 101 based on, for instance, their relative radio distances. The delay or stagger reduces the potential to saturate the traffic capacity of the ad-hoc mesh network 109. In addition, the awareness services module 111 may also determine whether to continue retransmission of a flooding message based on the distance category of the neighboring wireless node 101 from which the flooding message was received. For example, the awareness services module 111 may cancel retransmission of the flooding message if the transmitting neighboring wireless node 101 is in the very near category. For example, because the transmitting wireless node 101 is in the very near category, it is assumed that other neighboring wireless nodes 101 are also likely to have already received the flooding message. Therefore, retransmission is likely to be unnecessary. If the transmitting node 101 is in the far category, the awareness services module 111 will schedule the flooding message for retransmission because it is less likely that other neighboring nodes have already received the flooding message.

Additionally, the rebroadcast of the flooding message may be delayed or conditional. For example, after a predefined time (e.g., determined by the assigned retransmission time range) from the transmission of a previous flooding message by the same node 101 has elapsed, the message is sent to D2D radio layer 209 to be broadcasted and an entry for the new message is made in the MID table, with the sent flag set to "sent". This predefined time may be a dynamically adjustable parameter within the assigned retransmission time range that depends on the traffic situation in the mesh network 109. The higher is the traffic level and the utilization of the radio channel, the higher is the average power consumption in the nodes of network 109, and the longer should the predefined time interval between the broadcasts be. Normally, it is the awareness services module 111 that sets the time interval. However, it is contemplated that in some situations such traffic control means in the module 111 could be disabled deliberately. In some embodiments, the neighboring peer nodes do not carry forward flooding messages originating from a node 101 neglecting such restrictions.

In certain embodiments, upon rebroadcast, the MID table 277 is updated by setting the sent flag to "sent". In exemplary embodiments, the delay period is a random amount of time within the assigned retransmission time range (e.g., T1, T2), with the distribution of this time depending on the relative radio distance of the node that transmitted the flooding message. If the relative radio distance associated with a message is "near," the message is written into the message table 279 with the time to send set, for example, to a random value in the range [T1 . . . T1+T2]. If the relative radio distance associated with a message is "far" then the message is written into the message table 279 with the time to send set to a random value in the range [0 . . . T1]. This favors nodes that are further away to relay the flooding message forward, which results in better flooding efficiency (smaller total number of transmissions). The use of a random delay time also prevents the unintended synchronization of message broadcasts as the message propagates over the ad-hoc mesh network 109. For instance, unintended synchronization of the message broadcasts may result in too many nodes 101 sending broadcasting (i.e., flooding) messages over the ad-hoc mesh network 109 at exactly the same time. The lengths of these two retransmission time ranges, T1 and T2, are set based on the number of entries in the neighbor table: the higher the number of entries, the larger are T1 and T2. If the number of nodes in the neighbor table 275 is so small that all neighbors have been assigned a relative radio distance "near", T1 and T2 are set to zero. This way, at low node densities, all the nodes will rebroadcast all messages without delay in order to minimize the probability of flooding failure.

During the delay period for a given message, the possible new receptions of this same message (with equal MID) are recorded by incrementing the message counter in the message table 279. If the number of receptions exceeds a predefined limit (e.g., a typical value of between one and three), the message is dropped from the message table 279 and the scheduled transmission will not occur. Also, if the node from which the flooding message was received is "very near," the message is also deleted from the message table 279. The logic for this is that, in such a situation, most of the neighboring nodes already have received this message. This is also the reason why, at low node densities (small number of neighbors in the neighbor table 275), there most likely are no nodes in the "very near" category and, therefore, each flooding message is immediately retransmitted. In summary, the process 320 leads to, on average, each flooding message being received for a few times by each node 101 independent of the node density. The number of times a message is received by any one node 101 affects the scalability of the network 109.

FIG. 3C is a flowchart of a process for retransmitting a flooding message based on the density of neighboring wireless nodes, according to an exemplary embodiment. In one embodiment, the awareness services module 111 performs the process 340 of FIG. 3C and is implemented in, for instance, a chip set including a processor and a memory as shown in FIG. 9. As discussed above, the received flooding message can be immediately retransmitted without using the process of FIG. 3B. In step 341, the awareness services module 111 receives a flooding message from a neighboring wireless node 101. On receipt of the flooding message, the awareness services module 111 counts the number of neighboring wireless nodes 101 (step 343). For example, the awareness services module consults the neighbor table 275 to count how many entries corresponding to each neighboring wireless node 101 there are in the table 275. The awareness services module 111 then determines whether the count of the number of neighboring wireless nodes 111 is below a predetermined number. This predetermined number may be set according to a sufficiently low density of neighboring wireless nodes 101 so that (1) propagation of the flooding message will not be disrupted by the low density, and/or (2) the awareness services module 111 can assume that because of the low density, relatively few of the neighboring wireless nodes 101 have received the same flooding message. If the count is below the predetermined number, the awareness services immediately initiates retransmission of the flooding message to neighboring wireless nodes 101 (step 347). If the count is not below the predetermined number (e.g., when the density of neighboring wireless nodes 101 is relatively high), the awareness services module 111 initiates retransmission of the flooding message according to the process described with respect to FIG. 3B (step 349).

Figure 4A:
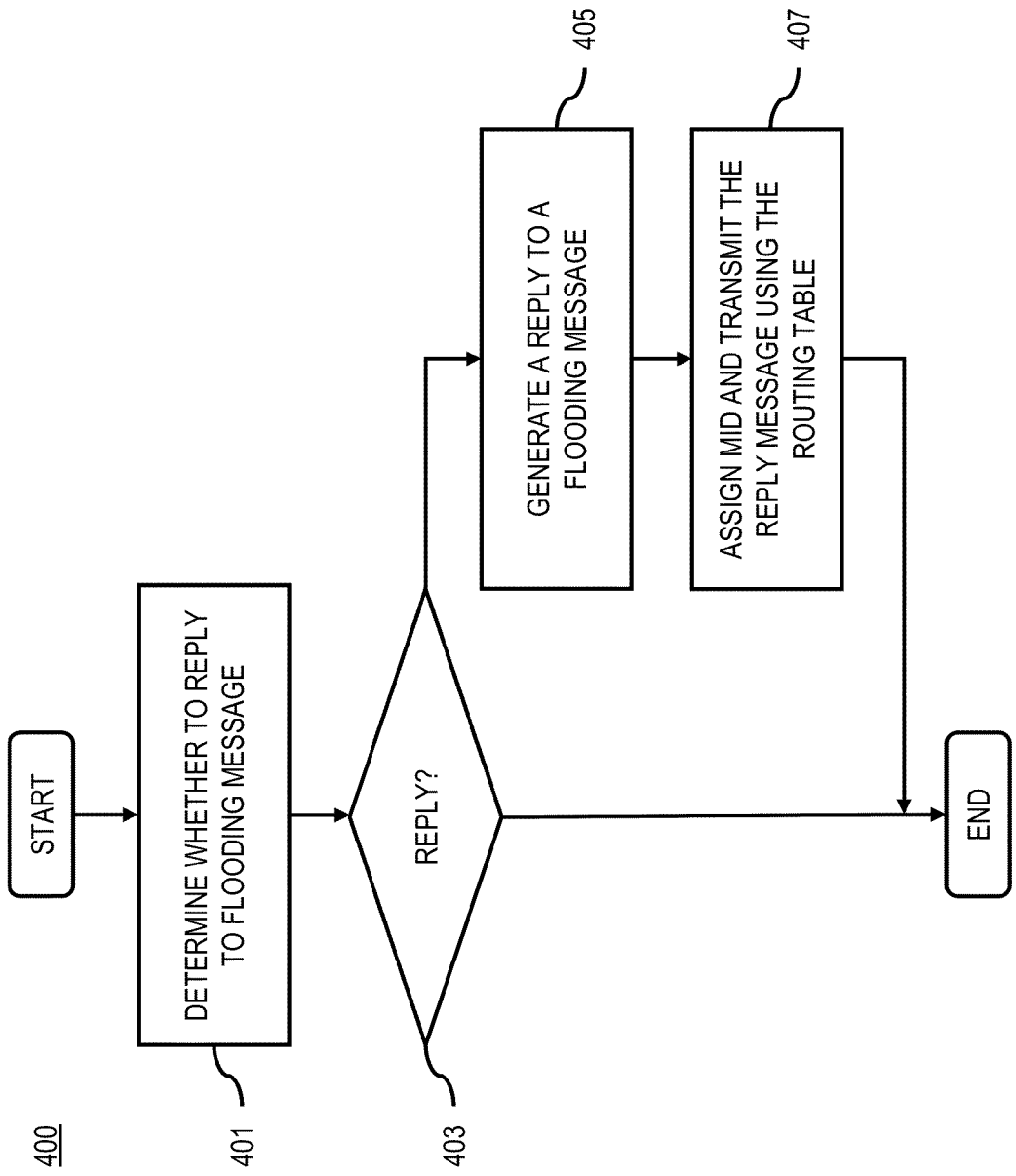
FIGS. 4A and 4B are flowcharts of processes for generating and receiving a unicast message over an ad-hoc mesh network, respectively, according to various exemplary embodiments.
Figure 4B:
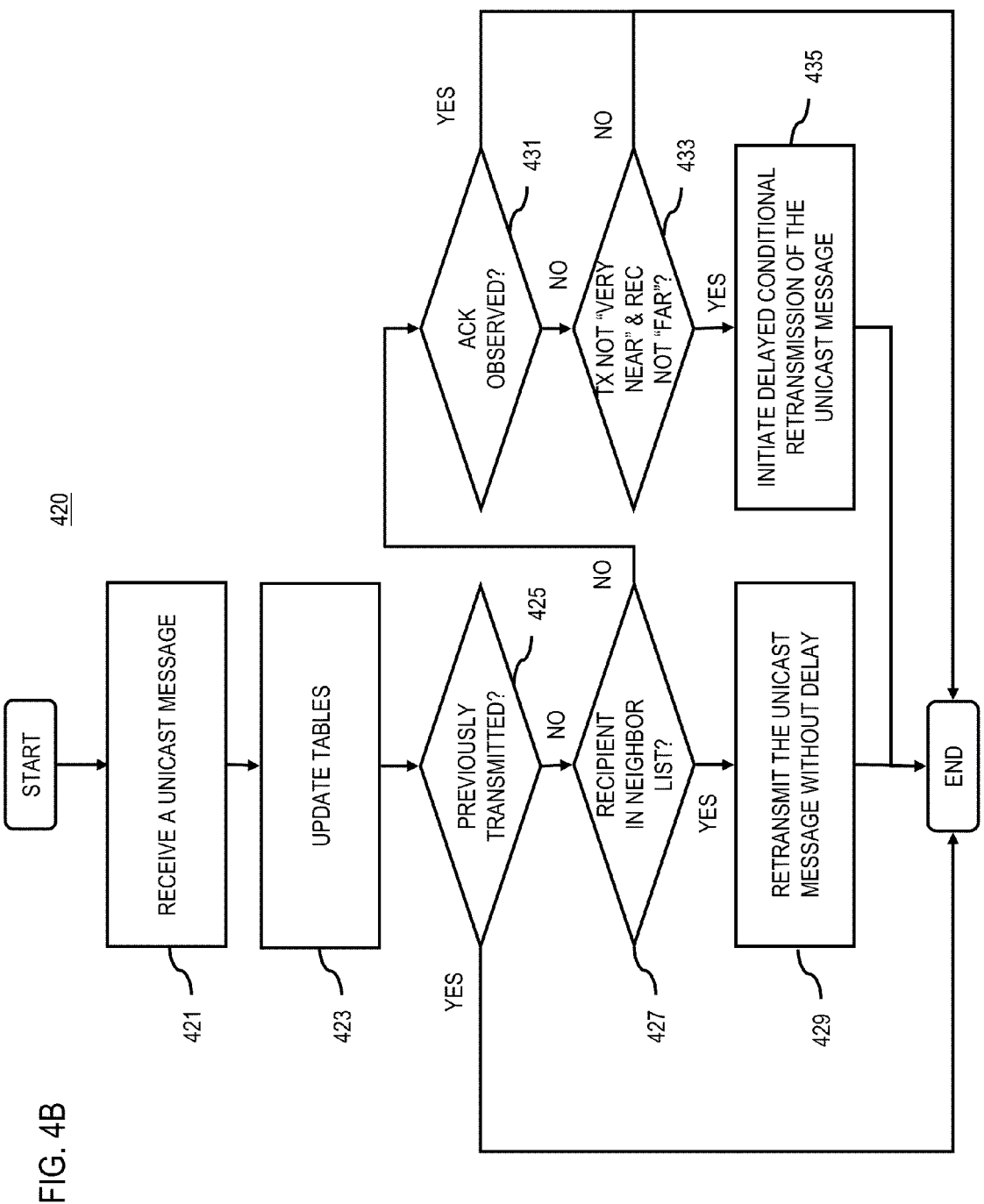

FIGS. 4A and 4B are flowcharts of processes for generating and receiving a unicast message over an ad-hoc message, respectively, according to various exemplary embodiments. In one embodiment, the awareness services module 111 performs the process 400 of FIG. 4A and the process 420 of FIG. 4B and is implemented in, for instance, a chip set including a processor and a memory as shown in FIG. 9. With respect to FIG. 4A, it is assumed that the awareness services module 111 has received a flooding message. In step 401, the awareness services module 111 determines whether to reply to the flooding message. For example, if the flooding message is a query for information, the awareness services module 111 determines whether the UE 101 has information to respond to the query (step 403). If the UE 101 contains the queried information, the awareness services module 111 creates a reply (e.g., a unicast message) to the received flooding message (step 405). By way of example, the reply message may contain information related to a query conveyed by the received flooding message. As part of the reply process, the awareness services module 111 assigns a new message sequence number (MSN) 285 for the reply message as well as the other fields in the network layer header 281. The reply message also includes, for instance, the NID of the destination module (e.g., the source node 101 that originated the flooding message). The awareness services module 111 then consults the routing table 273 to identify a receiving node for the transmission of the reply. In exemplary embodiments, the receiving node can be the originating node itself (e.g., if the originating node is within range) or an intermediate relaying node. The awareness services module 111 then transmits the reply in the next transmission opportunity using, for instance, a unicast message routed according to the routing table 273 (step 407). Upon transmission, a new entry is made in the MID table 277 with the sent flag set to "sent".

It is contemplated that unicast messages are normally used for replies to save network resources and reduce power consumption in the ad-hoc mesh network 109. In some embodiments, a flooding message can be used for a reply if requested by a flag in the query message. A replay via a flooding message can be appropriate, for instance, when the reply is likely to be of interest in a larger number of nodes within the ad-hoc mesh network 109. Another case for using a flooding message for a reply might occur if there is a considerable time gap between the query and the reply. In this case, the routing information generated by the flooding query in the mesh network 109 might have become obsolete.

FIG. 4B is a flowchart of a process for receiving a unicast message over an ad-hoc mesh network 109, according to an exemplary embodiment. The system 100 enables a unicast reply message to be routed back to the source node even when the route that carried the source flooding message to the receiving wireless node 101 no longer exists (e.g., because the original relaying nodes have exited the ad-hoc mesh network 109 or have changed locations). In step 421, the awareness services module 111 receives a reply message (e.g., a unicast reply message). It is noted that in the ad-hoc mesh network 109 unicast messages or acknowledgment messages that are transmitted within radio range of the receiving node 101 are received by the awareness services module 111 of that node 101. In this example, the receiving awareness services module 111 is not the ultimate intended recipient of the reply message (i.e., not the source node to which the reply is addressed). As with process as described with respect to FIG. 3B, the awareness services module updates the routing table 273 and MID table 277 (step 423). The routing table 273 is updated, for instance, when a message is received, whether the message is a flooding or a unicast message. If necessary, the routing information generated by the unicast reply messages can be used for further unicast message exchanges between the querying and replying nodes.

Next, the awareness services module 111 determines whether it has previously transmitted the reply message (step 425). The awareness services module 111 may, for instance, perform this check by examining the sent flag associated with the MID table 277 entry corresponding to the reply message. If the sent flag indicates that the awareness services module 111 has previously transmitted the reply, no further action is taken. If the sent flag indicates that the reply message has not previously been sent, the awareness services module 111 examines whether the intended recipient of the message is in the neighbor table 275 (step 427). In one embodiment, visible neighboring nodes 101 are entered into the neighbor table 275. For example, a node 101 is placed in the neighbor table 275 if a message or beacon signal is received from that node 101 within a predetermined period of time. If yes, the awareness services module 111 initiates a collaborative reply process to initiate retransmission of the received unicast reply message to the intended recipient node 101 (e.g. a source node). By way of example, the awareness services module 111 consults the routing table 273 to determine whether there is an available route towards the source node. If there is a route (e.g., either directly to the source node or through another relaying node), the awareness services module 111 retransmits the unicast message in the next transmission opportunity and updates the sent flag of the corresponding MID table 277 entry to indicate that it has retransmitted a unicast message with the given MID (step 429). In some embodiments, if no acknowledgment is received from the addressed recipient and another entry for the same destination node is found in the routing table 273, a new transmission of the same message is made towards the neighboring node indicated in that entry. This process may be repeated for a number of times, or until the transmitter NID list (Table 1) in the routing table 273 is exhausted.

If the intended recipient node 101 is not in the neighbor table 275, the awareness services module 111 uses the collaborative reply process to listen for an acknowledgement of receipt of the reply message by the intended recipient node 101. If an acknowledgement is observed, the awareness services module ends the collaborative reply process. If no acknowledgment from the intended recipient node is observed, the awareness services module 111 determines the relative radio distances of the neighboring node 101 that transmitted the reply message the intended recipient node 101. If the relative radio distance of the intended recipient node 101 is set as "far" in the neighbor table 275, the collaborative reply process is cancelled. Also, if the node that transmitted the message is "very near," the collaborative reply process is cancelled. In this way, the awareness services module avoids unnecessarily retransmitting the reply message, thereby reducing bandwidth and power requirements for the collaborative reply process. Otherwise the awareness services module 111 initiates a delayed retransmission of the unicast message by writing the message in the message table 279. If the relative radio distance of the addressed recipient is "near," the message is written into the message table 279 with the time to send set, for example, to a random value in the range [T1 . . . T1+T2]. If the relative radio distance of the addressed recipient is "very near" then the message is written into the message table 279 with the time to send set to a random value in the range [0 . . . T1]. The use of a random delay prevents excessive multiplication of the unicast messages. The lengths of these two time ranges, T1 and T2, are set based on the number of entries in the neighbor table: the higher the number of entries, the larger are T1 and T2. If the number of nodes in the neighbor table 275 is so small that all neighbors have been assigned a relative radio distance "near," T1 and T2 are set to zero. This way, at low node densities, all the nodes will retransmit all messages without delay in order to minimize the probability of routing failure. This may lead to multiplication of messages, but the redundant messages will typically die as they propagate further (they are not forwarded because they are recorded in the MID tables of the nodes though which they have passed.

During the delay period for a given message, observations of any successful receptions of this same message (with equal MID) by other nodes are monitored. Observation of a successful reception by another node means that both the message and a reception acknowledgment by the addressed node are received. Upon such an observation, the scheduled transmission of this message is, for instance, cancelled and the message is removed from the message table 279.

If the delayed retransmission the same message is not cancelled by the time when the message is scheduled to be transmitted, the node will transmit it to the correct receiver found from the routing table 273. In this way, the nodes 101 that are not the intended recipients of the reply messages can assist in routing the message forward towards the correct destination.

Figure 5A:
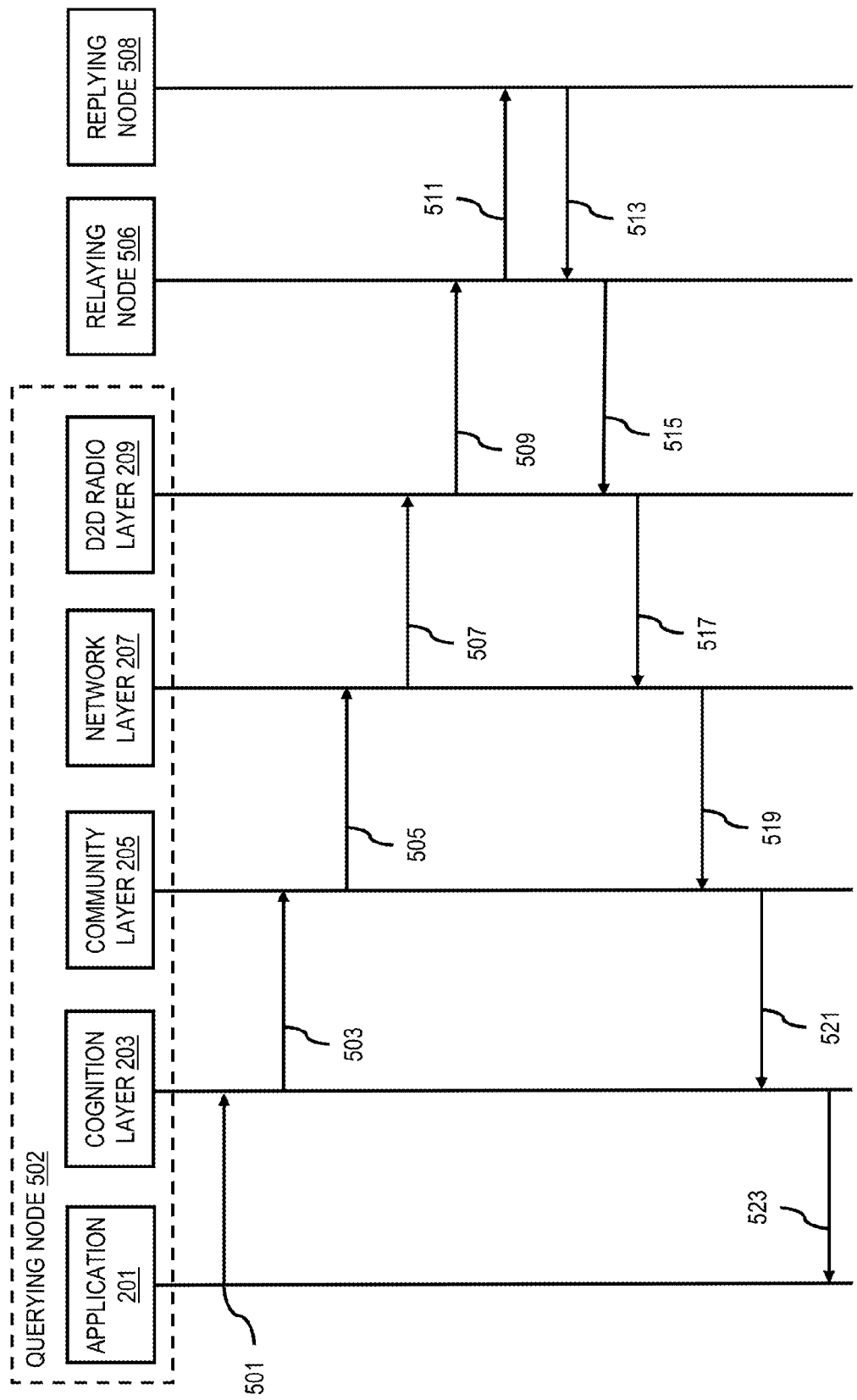
FIG. 5A is a ladder diagram that illustrates a sequence of messages and processes used in a querying node, according to an exemplary embodiment.

FIG. 5A is a ladder diagram that illustrates a sequence of messages and processes used in a querying node, according to an exemplary embodiment. A network process is represented by a thin vertical line. A step or message passed from one process to another is represented by horizontal arrows. A dashed horizontal arrow represents an optional step or message. The processes represented in FIG. 5A are the querying node 502, relaying node 506, and replying node 508. Within querying node 502, the following additional processes are represented: application 504, cognition layer 203, community layer 205, network layer 207, and D2D radio layer 209.

In step 501, the application 201 within querying node 502 generates a request for searching information over the ad-hoc mesh network 109 and sends the request to the cognition layer 203 of the querying node 502. The cognition layer 203 generates a query message, assigns a query identification number (QID) to the query message and forwards the query message to the community layer 205 of the querying node 502 (step 503).

The community layer 205 prepares the query message for transmission over the ad-hoc mesh network 109 by marking the query with a CID of the community from which the user is seeking information. If the community is private, the community layer 205 encrypts the query message using the authentication keys associated with the respective CID and stored in the community directory 243 (FIG. 2C). The community layer 205 then anonymizes the CID attached to the query using the authentication keys associated with the respective CID and sends the anonymized and possibly encrypted messaged to the network layer 207 (step 505).

The network layer 207 assigns a message sequence number (MID) to the query message and adds fields to the network layer message header 281 (FIG. 2F) to indicate that the querying node 502 is the source and transmitter of the query message (e.g., using the NID). The network layer 207 sends the query message to the D2D radio layer 209 of the querying node 502 for broadcasting to the ad-hoc mesh network 109 (step 507).

The query message is then broadcasted to one or more relaying nodes 506 (step 509). All the nodes that are able to receive the broadcast message are relaying nodes. The processes of the relaying node are described with respect to FIG. 5B. After processing by the relaying node 506, the query message is rebroadcasted to another relaying node or to the replying node 508 (step 515). The processes of the replying node 508 are described with respect to FIG. 5C. After processing of the query message by the replying node 508, a reply message is generated and sent to the relaying node 506 (step 513) which routes the reply message either to another relaying node or to the querying node 502 (step 515) based on the route stored in the routing table 273.

At the querying node 502, the D2D radio layer 209 receives and acknowledges the reply message and forwards the reply message to the network layer 207 (step 517). The network layer 207 determines that the querying node 502 is the intended destination of the reply message by checking the DST field 294 in the network layer message header 281 and sends the message to the community layer 205 for processing (step 519). In case of a private community, the community layer 205 decrypts the reply message using the appropriate authentication keys stored in the community directory 243. Then the community layer 205 sends the decrypted reply message to the cognition layer 203 (step 521). The cognition layer 203 then provides the application 201 with a service response using the content of the reply message and the QID contained in the reply message (step 523).

Figure 5B:
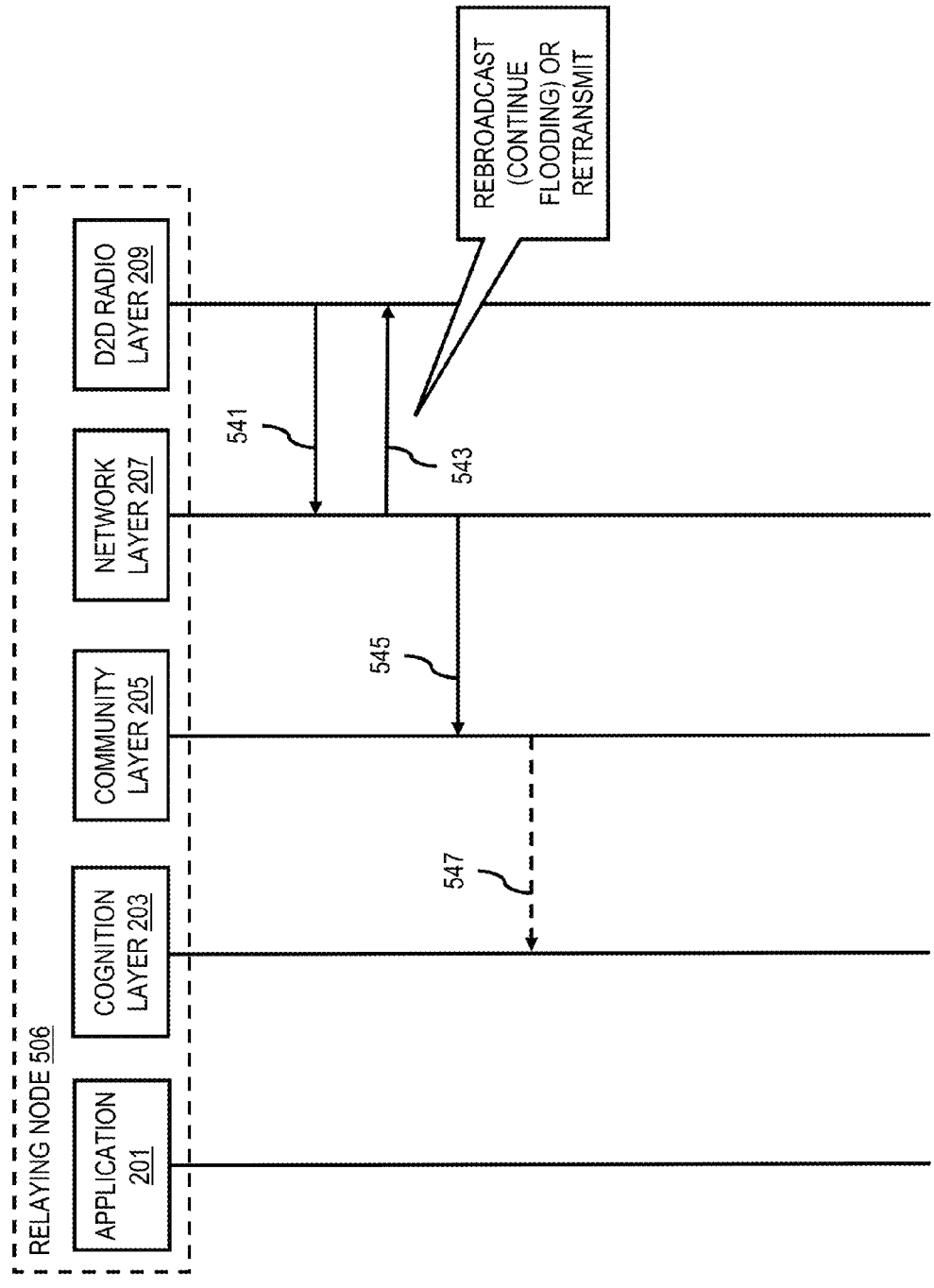
FIG. 5B is a ladder diagram that illustrates a sequence of messages and processes used in a relaying node, according to an exemplary embodiment.

FIG. 5B is a ladder diagram that illustrates a sequence of messages and processes used in a relaying node, according to an exemplary embodiment. A network process is represented by a thin vertical line. A step or message passed from one process to another is represented by horizontal arrows. A dashed horizontal arrow represents an optional step or message. The processes represented in FIG. 5B are the application 201, cognition layer 203, community layer 205, network layer 207, and D2D radio layer 209 of the relaying node 506.

In step 541, the D2D radio layer of the relaying node 506 receives a query message either from the querying node 502 or from another relaying node and sends the message to the network layer 207. The network layer performs the steps 323 to 329 (FIG. 3B) to determine whether to rebroadcast the query message. If the network layer 207 decides to rebroadcast the query, it sends the query message back to the D2D radio layer 209 for transmission (step 543).

The network layer 207 also forwards the query message to the community layer 205 (step 545). If the community layer 205 determines that the query message contains the anonymized CID of an active community associated with the relaying node 506 based on the information stored in the community directory 243 (FIG. 2C), the community layer decrypts the message and forwards it to the cognition layer 203. In this example, the relaying node 506 does not have any matching information in the item storage 223 (FIG. 2B) and serves only to relay the query message.

In another example, in step 541, the D2D radio layer of the relaying node 506 receives a reply message either from the replying node 508 or from another relaying node and sends the message to the network layer 207. The network layer performs the steps 423 to 435 (FIG. 4B) to determine whether to retransmit the reply message. If the network layer 207 decides to retransmit the reply, it sends the reply message back to the D2D radio layer 209 for transmission (step 543).

The network layer 207 also forwards the reply message to the community layer 205 (step 545). If the community layer 205 determines that the reply message contains the anonymized CID of an active community associated with the relaying node 506 based on the information stored in the community directory 243 (FIG. 2C), the community layer decrypts the message and forwards it to the cognition layer 203 that may store the information in the reply message in its item storage 223.

FIG. 5C is a ladder diagram that illustrates a sequence of messages and processes used in a replying node, according to an exemplary embodiment. A network process is represented by a thin vertical line. A step or message passed from one process to another is represented by horizontal arrows. A dashed horizontal arrow represents an optional step or message. The processes represented in FIG. 5C are the replying node 508 and the querying node 502. Within replying node 508, the following additional processes are represented: application 201, cognition layer 203, community layer 205, network layer 207, and D2D radio layer 209.

In step 561, the D2D radio layer 209 of the replying node 508 receives the query message and forwards it to the network layer 207 of the replying node 508 according to the same process as described with respect the relaying node 506 of FIG. 5B. The network layer 207 may decide to rebroadcast the query message (step 563). On receipt, the network layer 207 forwards the query message to the community layer 205 (step 565).

If the community layer 205 determines that the query message contains an anonymized CID of an active community associated with the replying node 508, the community layer 205 decrypts the message, if private, and forwards the query message to the cognition layer 203 (step 567). If an item matching to the query is found in the item storage 223 of the replying node 508, the cognition layer generates a reply message that contains the same QID as the incoming query and has the source NID of the query message set as the destination NID of the reply message. Next, the cognition layer forwards the message to the community layer 205 (step 569). If the community to which the reply message relates to is a private community the reply message is encrypted using the keys associated with the community. The community layer 205 then anonymizes the community identifier CID and sends the reply message to the network layer 207 (step 571).

On receipt of the reply message, the network layer 207 assigns a new message sequence number (MSN) to the reply message, attaches NID of the replying node 508 as the source and transmitter, finds the NID of the relaying node 506 for the next hop from the routing table 263, sets the target NID of the reply message as the next hop and sends the reply message to the D2D radio layer 209 (step 569). The D2D radio layer 209 sends the reply message as a unicast message addressed to a relaying node 506 over the ad-hoc mesh network 109.

FIGS. 6A-6B are diagrams of a user interface utilized in the process of providing awareness information over an ad-hoc mesh network, according to various exemplary embodiments.

FIG. 6A depicts a user interface 600 listing community related information and commands for managing and accessing awareness information. For example, section 601 lists community members who are nearby the wireless node 101. The members may be from one or more different communities. Selecting a member enables a user to contact the member, view the status of the member, or access other applications or functions related to the user. Section 603 may display, for instance, status commands or prompts such as an invitation to join a particular community. User interface 600 also provides selectable menu options 605 to initiate additional commands. For example, selecting the option "Around Me" prompts the display of a map 607 with the locations of community members.

FIG. 6B depicts a user interface 620 for managing communities. For instance, section 621 displays currently defined communities with an option 623 to activate or deactivate each community individually. Users may also designate each community as either public or private using the control 625. Members of each community are displayed in section 627, along with controls 629 for adding or removing members.

Figure 7:
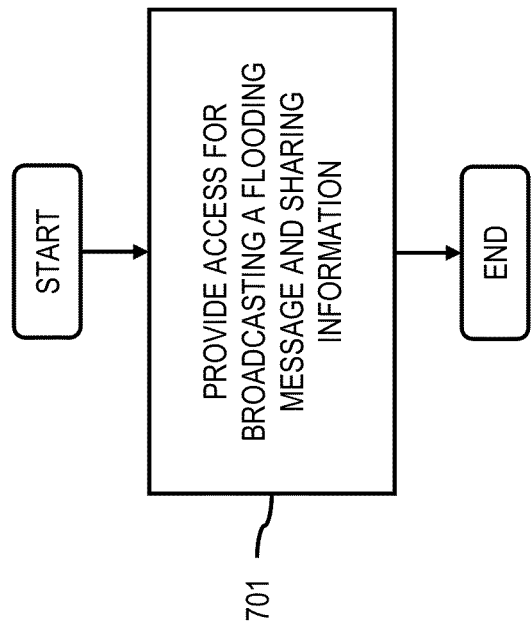
FIG. 7 is a flowchart of a process for providing access for broadcasting flooding message and sharing information anonymously, according to an exemplary embodiment.

FIG. 7 is a flowchart of a process for providing access for broadcasting flooding message and sharing information anonymously, according to an exemplary embodiment. In step 701, the communication network 103 provides access and support for receiving a reply message to a flooding message from a neighboring wireless node, determining whether an intended receiving wireless node of the reply is specified in a neighbor table, and initiating a collaborative reply process if the receiving wireless node is specified in the neighbor table. For example, the reply message supports the sharing of awareness information anonymously over the ad-hoc mesh network 109. In exemplary embodiments, flooding messages and shared information contain pointers to information and content and not the information and content itself to minimize data traffic over the ad-hoc mesh network 109. Instead, wireless nodes 101 within the ad-hoc mesh network 109 obtain the actual information or content over conventional communication systems and protocols. However, the flooding message may contain the actual content if the content is small in size (e.g., a few bytes). In exemplary embodiments, the flooding message includes an identifier of a neighboring wireless node and a message sequence number that is assigned by a source node initiating the flooding message. In addition, it is contemplated that the communication network 103 works in conjunction with the ad-hoc mesh network 109 to provide sufficient network resources (e.g., bandwidth, etc.) to facilitate that transfer of the information and content specified in the flooding messages of the system 100.

The processes described herein for providing awareness information over an ad-hoc mesh network may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
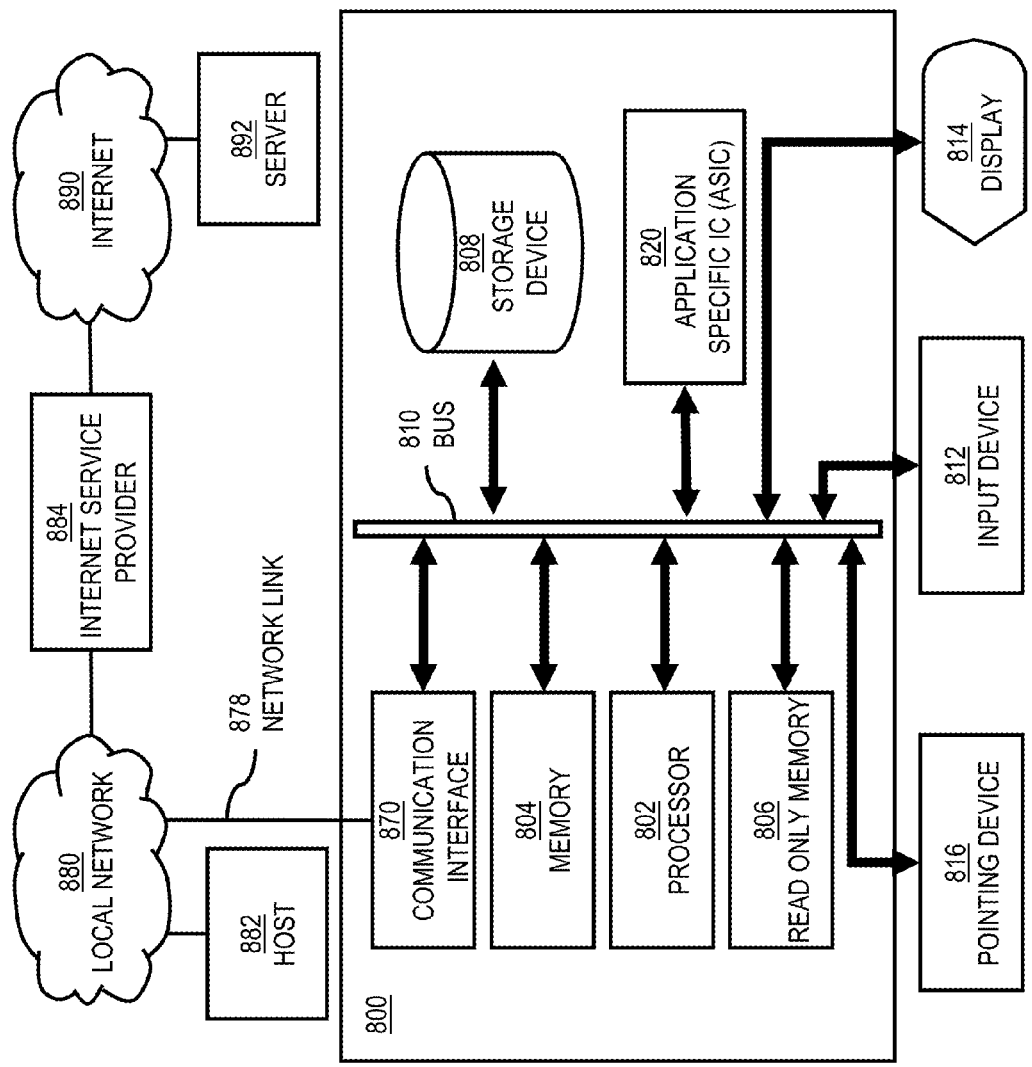
FIG. 8 is a diagram of hardware that can be used to implement an embodiment of the invention.

FIG. 8 illustrates a computer system 800 upon which an embodiment of the invention may be implemented. Computer system 800 is programmed to provide a user interface as described herein and includes a communication mechanism such as a bus 810 for passing information between other internal and external components of the computer system 800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information related to providing awareness information over an ad-hoc mesh network 109. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions for providing awareness information over an ad-hoc mesh network 109. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions for providing awareness information over an ad-hoc mesh network 109, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver. In exemplary embodiments, the communications interface 870 enables connection to the communication network 103 for providing awareness information over an ad-hoc mesh network 109.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 9 illustrates a chip set 900 upon which an embodiment of the invention may be implemented. Chip set 900 is programmed to provide awareness information over an ad-hoc mesh network 109 as described herein and includes, for instance, the processor and memory components described with respect to FIG. 9 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein to provide awareness information over an ad-hoc mesh network 109. The memory 905 also stores the data associated with or generated by the execution of the inventive steps.

Figure 10:
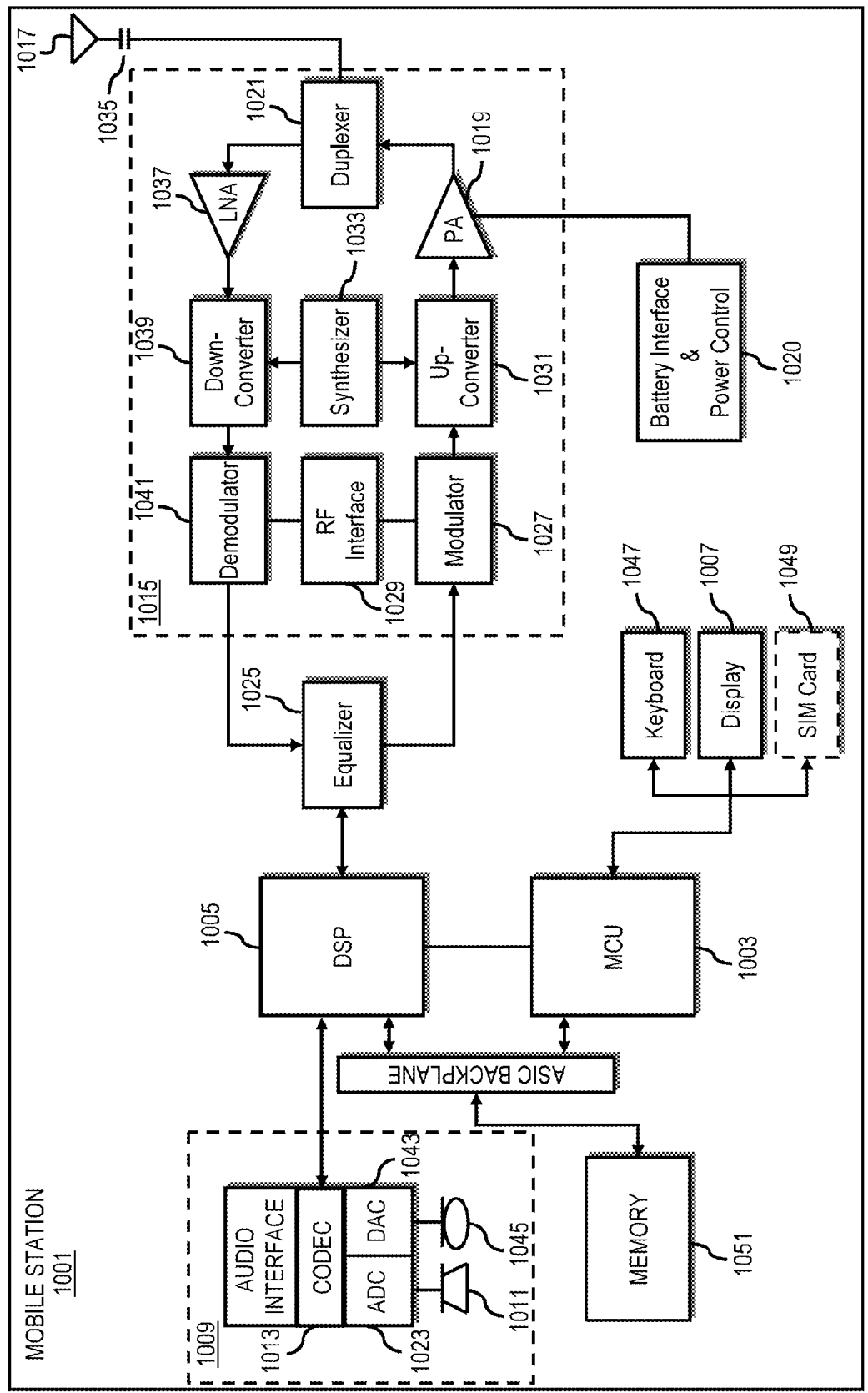
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions such as the awareness services module 111. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The keyboard 1047 and/or the MCU 1003 in combination with other user input components (e.g., the microphone 1011) comprise a user interface circuitry for managing user input. The MCU 1003 runs a user interface software to facilitate user control of at least some functions of the mobile station 1001. The MCU 1003 also delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A method comprising:
   exchanging via a processor an event identification code between two or more wireless nodes over an ad-hoc mesh network via an anonymous message while attending an event corresponding to the exchanged event identification code, wherein at least one of the two or more wireless nodes previously stores the event identification code prior to the exchanging based on an event invitation including the event identification code, and wherein the at least one of the two or more wireless nodes is a wireless device of a user; and
   establishing via the processor whether the user is at the event corresponding to the stored event identification code by comparison of the exchanged event identification code received by the wireless device of the user with the stored event identification code.

2. A method of claim 1, further comprising:
   causing, at least in part, the wireless device of the user to know that it is at a location of the event corresponding to the exchanged event identification code based on awareness information from other wireless nodes that are within a radio range of the wireless device of the user that receives the anonymous message therefrom via the ad-hoc mesh network,
   wherein the awareness information is shared between wireless nodes via the anonymous message.

3. A method of claim 1, further comprising:
   providing navigational services to the wireless device of the user via positioning information of neighboring wireless nodes having positioning capabilities,
   wherein the positioning information of neighboring wireless nodes having positioning capabilities is provided to the wireless device of the user via awareness information provided by the anonymous message.

4. A method of claim 1, further comprising:
   providing position information to the wireless device of the user via positioning information of neighboring wireless nodes having positioning capabilities, and
   providing a reminder message regarding the event to the user based, at least in part, on the position information.

5. A method of claim 1, wherein the anonymous message includes a temporal limit corresponding to the event and is retransmitted only for a duration of the event.

6. A method of claim 5, wherein the wireless device of the user accesses a clock service to determine current time and does not retransmit the anonymous message regarding the event if the current time is subsequent to the temporal limit corresponding to the event.

7. A method of claim 1, wherein the anonymous message includes a context limit, the method further comprising:
   rebroadcasting the anonymous message only if a context of a node receiving the anonymous message matches the context limit of the received anonymous message.

8. An apparatus comprising:
   at least one processor; and
   at least one memory including computer program code for one or more programs,
   the at least one memory and the computer program code configured to, with the at least one processor, cause the apparatus to perform at least the following:
   exchange an event identification code between two or more wireless nodes over an ad-hoc mesh network via an anonymous message while attending an event corresponding to the exchanged event identification code, wherein at least one of the two or more wireless nodes previously stores the event identification code prior to the exchanging based on an event invitation including the event identification code, and wherein the at least one of the two or more wireless nodes is a wireless device of a user; and
   establish whether the user is at the event corresponding to the stored event identification code by comparison of the exchanged event identification code received by the wireless device of the user with the stored event identification code.

9. An apparatus of claim 8, wherein the apparatus is further caused, at least in part, to:

cause, at least in part, the wireless device of the user to know that it is at a location of the event corresponding to the exchanged event identification code based on awareness information from other wireless nodes that are within a radio range of the wireless device of the user that receives the anonymous message therefrom via the ad-hoc mesh network, wherein the awareness information is shared between wireless nodes via the anonymous message.

10. An apparatus of claim 8, wherein the apparatus is further caused, at least in part, to:

provide navigational services to the wireless device of the user via positioning information of neighboring wireless nodes having positioning capabilities, wherein the positioning information of neighboring wireless nodes having positioning capabilities is provided to the wireless device of the user via awareness information of the anonymous message.

11. An apparatus of claim 8, wherein the apparatus is further caused, at least in part, to:

provide position information to the wireless device of the user via positioning information of neighboring wireless nodes having positioning capabilities, and provide a reminder message regarding the event to the user based, at least in part, on the position information.

12. An apparatus of claim 8, wherein the anonymous message includes a temporal limit corresponding to the event and is retransmitted only for a duration of the event.

13. An apparatus of claim 12, wherein the wireless device of the user accesses a clock service to determine current time and does not retransmit the anonymous message regarding the event if the current time is subsequent to the temporal limit corresponding to the event.

14. An apparatus of claim 8, wherein the anonymous message includes a context limit, and wherein the apparatus is further caused, at least in part, to:

rebroadcast the anonymous message only if a context of a node receiving the flooding message matches the context limit of the received anonymous message.

15. A non-transitory computer-readable storage medium carrying one or more sequences of one or more instructions which, when executed by one or more processors, cause an apparatus to at least perform:

exchange an event identification code between two or more wireless nodes over an ad-hoc mesh network via an anonymous message while attending an event corresponding to the exchanged event identification code, wherein at least one of the two or more wireless nodes previously stores the event identification code prior to the exchanging based on an event invitation including the event identification code, and wherein the at least one of the two or more wireless nodes is a wireless device of a user; and establish whether the user is at the event corresponding to the stored event identification code by comparison of the exchanged event identification code received by the wireless device of the user with the stored event identification code.

16. A non-transitory computer-readable storage medium of claim 15, wherein the apparatus is caused, at least in part, to further perform:

cause, at least in part, the wireless device of the user to know that it is at a location of the event corresponding to the exchanged event identification code based on awareness information from other wireless nodes that are within a radio range of the wireless device of the user that receives the anonymous message therefrom via the ad-hoc mesh network, wherein the awareness information is shared between wireless nodes via the anonymous message.

17. A non-transitory computer-readable storage medium of claim 15, wherein the apparatus is caused, at least in part, to further perform:

provide navigational services to the wireless device of the user via positioning information of neighboring wireless nodes having positioning capabilities, wherein the positioning information of neighboring wireless nodes having positioning capabilities is provided to the wireless device of the user via awareness information of the anonymous message.

18. A non-transitory computer-readable storage medium of claim 15, wherein the apparatus is caused, at least in part, to further perform:

provide position information to the wireless device of the user via positioning information of neighboring wireless nodes having positioning capabilities, and provide a reminder message regarding the event to the user based, at least in part, on the position information.

19. A non-transitory computer-readable storage medium of claim 15, wherein the anonymous message includes a temporal limit corresponding to the event, and wherein the wireless device of the user accesses a clock service to determine current time and does not retransmit the anonymous message regarding the event if the current time is subsequent to the temporal limit corresponding to the event.

20. A non-transitory computer-readable storage medium of claim 15, wherein the anonymous message includes a context limit, and wherein the apparatus is caused, at least in part, to further perform:

rebroadcast the anonymous message only if a context of a node receiving the anonymous message matches the context limit of the received anonymous message.

\* \* \* \* \*